US011807068B2

(12) United States Patent
Huang et al.

(10) Patent No.: US 11,807,068 B2
(45) Date of Patent: Nov. 7, 2023

(54) VEHICLE AND TEMPERATURE CONTROL DEVICE THEREOF

(71) Applicant: BYD COMPANY LIMITED, Shenzhen (CN)

(72) Inventors: Wei Huang, Shenzhen (CN); Yong Xiong, Shenzhen (CN); Gan Song, Shenzhen (CN); Yili Luo, Shenzhen (CN); Penghui Song, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 218 days.

(21) Appl. No.: 17/416,726

(22) PCT Filed: Dec. 18, 2019

(86) PCT No.: PCT/CN2019/126361
§ 371 (c)(1),
(2) Date: Jun. 21, 2021

(87) PCT Pub. No.: WO2020/125684
PCT Pub. Date: Jun. 25, 2020

(65) Prior Publication Data
US 2022/0041031 A1 Feb. 10, 2022

(30) Foreign Application Priority Data
Dec. 21, 2018 (CN) .......................... 201811574135.3

(51) Int. Cl.
*B60H 1/32* (2006.01)
*B60H 1/00* (2006.01)
(Continued)

(52) U.S. Cl.
CPC .......... *B60H 1/00278* (2013.01); *B60L 58/26* (2019.02); *B60W 10/08* (2013.01);
(Continued)

(58) Field of Classification Search
CPC ...... B60H 1/00278; B60H 2001/00307; B60L 58/26; B60W 10/08; B60W 10/30; B60W 2510/087
(Continued)

(56) References Cited

U.S. PATENT DOCUMENTS

2012/0222441 A1 9/2012 Sawada et al.
2012/0280660 A1 11/2012 Aga et al.
(Continued)

FOREIGN PATENT DOCUMENTS

CN 1953317 A 4/2007
CN 103392258 A 11/2013
(Continued)

OTHER PUBLICATIONS

The World Intellectual Property Organization (WIPO) International Search Report for PCT/CN2019/126361 dated Mar. 20, 2020 6 pages (with translation).

*Primary Examiner* — Davis D Hwu
(74) *Attorney, Agent, or Firm* — Wenye Tan

(57) ABSTRACT

A vehicle and a temperature control device thereof are disclosed. The temperature control device includes a motor control circuit and a heat exchange medium circulation loop. The motor control circuit includes a switch module, a three-phase inverter, a three-phase alternating current motor, and a control module. The heat exchange medium circulation loop includes a first valve electrically connected to the control module. At least one of the three-phase inverter and the three-phase alternating current motor and the first valve form an electrically driven cooling loop through a heat exchange medium pipeline. The first valve and a component to be heated form a cooling loop through a heat exchange medium pipeline.

20 Claims, 14 Drawing Sheets

(51) Int. Cl.
  *B60L 58/26* (2019.01)
  *B60W 10/08* (2006.01)
  *B60W 10/30* (2006.01)
(52) U.S. Cl.
  CPC ... *B60W 10/30* (2013.01); *B60H 2001/00307* (2013.01); *B60W 2510/087* (2013.01)
(58) Field of Classification Search
  USPC .......................................................... 62/239
  See application file for complete search history.

(56) References Cited

U.S. PATENT DOCUMENTS

2018/0345815 A1   12/2018   Porras et al.
2019/0068028 A1*   2/2019   Tominaga ............... B60K 11/02

FOREIGN PATENT DOCUMENTS

| | | |
|---|---|---|
| CN | 103457318 A | 12/2013 |
| CN | 103560304 A | 2/2014 |
| CN | 103612570 A | 3/2014 |
| CN | 204870439 U | 12/2015 |
| CN | 105762434 A | 7/2016 |
| CN | 106025445 A | 10/2016 |
| CN | 106898841 A | 6/2017 |
| CN | 107097664 A | 8/2017 |
| CN | 107592954 A | 1/2018 |
| CN | 107666028 A | 2/2018 |
| CN | 108511848 A | 9/2018 |
| EP | 2305494 A1 | 4/2011 |
| EP | 2508379 A1 | 10/2012 |
| EP | 3900963 A1 | 10/2021 |
| JP | 2009225602 A | 10/2009 |
| JP | 2010246312 A | 10/2010 |
| JP | 2011073536 A | 4/2011 |
| JP | 2012014392 A | 1/2012 |
| JP | 2013119259 A | 6/2013 |
| JP | 2014034220 A | 2/2014 |
| JP | WO2014189093 A1 * | 11/2014 |
| JP | 5732846 B2 | 6/2015 |
| WO | 2020125684 A1 | 6/2020 |

* cited by examiner

VEHICLE AND TEMPERATURE CONTROL DEVICE THEREOF

CROSS-REFERENCE TO RELATED APPLICATIONS

The present application is a national phase entry under 35 U.S.C. § 371 of International Application No. PCT/CN2019/126361, filed on Dec. 18, 2019, which is based upon and claims priority to Chinese Patent Application No. 201811574135.3, filed on Dec. 21, 2018, the entire content of all of which is incorporated herein by reference in its entirety.

FIELD

The present disclosure relates to the technical field of vehicles, and in particular, to a vehicle and a temperature control device thereof.

BACKGROUND

In recent years, with the rapid development of new energy vehicles, lithium ion-based power batteries have been widely used. Due to the inherent characteristics of batteries, the charge-discharge capacity of power batteries at low temperature will be greatly reduced, which will affect the use of vehicles in cold areas.

In order to solve the problem, one technical solution in the existing technology is that the temperature of a power battery unit is obtained and sent through a battery management system, if the temperature is lower than a preset temperature threshold, a vehicle controller unit commands an engine controller to control an engine to uniformly rotate at a certain speed through CAN communication, the engine drives a generator to rotate, and the generator rapidly charges and discharges the power battery unit to achieve the purpose of preheating a battery pack. According to the technical solution, one more engine is provided on an energy transfer path, and the heat efficiency of the engine is low, which leads to the low heating efficiency of the whole battery.

Another technical solution in the existing technology is that when an ambient temperature is low and a component to be heated needs to be heated, a PTC heater needs to be used, so that the cost is increased, and if the PTC heater is damaged, the secondary cost is increased.

Accordingly, the existing technology has the problems that the heating efficiency of batteries is low since a component to be heated is heated by an engine in a low-temperature state and that the cost is increased since the component to be heated is heated by a PTC heater.

SUMMARY

The present disclosure provides a vehicle and a temperature control device thereof, which aim to solve the problems in the existing technology that the heating efficiency of a component to be heated is low since the component to be heated is heated by an engine in a low-temperature state and that the cost is increased since the component to be heated is heated by a PTC heater.

The present disclosure is implemented in such a way that a first aspect of the present disclosure provides a temperature control device, including: a motor control circuit and a heat exchange medium circulation loop.

The motor control circuit includes a switch module, a three-phase inverter, a three-phase alternating current motor, and a control module. The motor control circuit is connected to a power supply module through the switch module. Three phases of coils of the three-phase alternating current motor are connected to three phases of bridge legs of the three-phase inverter. A common contact of the three phases of coils of the three-phase alternating current motor is connected to the switch module. The control module is connected to the power supply module, the switch module, the three-phase inverter, and the three-phase alternating current motor.

The heat exchange medium circulation loop includes a first valve electrically connected to the control module. At least one of the three-phase inverter and the three-phase alternating current motor and the first valve form an electrically driven cooling loop through a heat exchange medium pipeline. The first valve and a component to be heated form a cooling loop through a heat exchange medium pipeline.

When obtaining that the component to be heated needs to be heated, the control module controls the switch module to be turned on, controls the first valve to turn on the electrically driven cooling loop and the cooling loop, and enables the power supply module to charge and discharge the energy storage module and the three phases of coils alternately by controlling the three-phase inverter, so that the three-phase inverter and the three-phase alternating current motor heat a heat exchange medium flowing through at least one of the three-phase inverter and the three-phase alternating current motor via the electrically driven cooling loop.

A second aspect of the present disclosure provides a vehicle, further including the temperature control device described in the first aspect.

The present disclosure provides a vehicle and a temperature control device thereof. The temperature control device includes a motor control circuit and a heat exchange medium circulation loop. The motor control circuit includes a switch module, a three-phase inverter, a three-phase alternating current motor, and a control module. The heat exchange medium circulation loop includes a first valve electrically connected to the control module. At least one of the three-phase inverter and the three-phase alternating current motor and the first valve form an electrically driven cooling loop through a heat exchange medium pipeline. The first valve and a component to be heated form a cooling loop through a heat exchange medium pipeline. According to the technical solution of the present disclosure, a vehicle management system is slightly modified, only the first valve needs to be added for the series connection of an electrically driven cooling loop and a cooling loop, and a heater is replaced with heat generated by a motor, so that the cost of a solution for heating a component to be heated can be effectively reduced, and the utilization efficiency of parts can be improved.

BRIEF DESCRIPTION OF THE DRAWINGS

To describe the technical solutions of the embodiments of the present disclosure more clearly, the following briefly introduces the accompanying drawings for describing the disclosed embodiments. Apparently, the accompanying drawings in the following description show only some embodiments of the present disclosure, and a person of ordinary skill in the art may still derive other drawings from these accompanying drawings without creative efforts.

DETAILED DESCRIPTION

To make the objectives, technical solutions and advantages of the present disclosure more apparent and clearer, the following describes the present disclosure in further detail with reference to the accompanying drawings and embodiments. It should be understood that the specific embodiments described therein are merely used for explain the present disclosure instead of limiting the present disclosure.

In order to describe the technical solutions of the present disclosure, description is made below by using specific embodiments.

Figure 1:
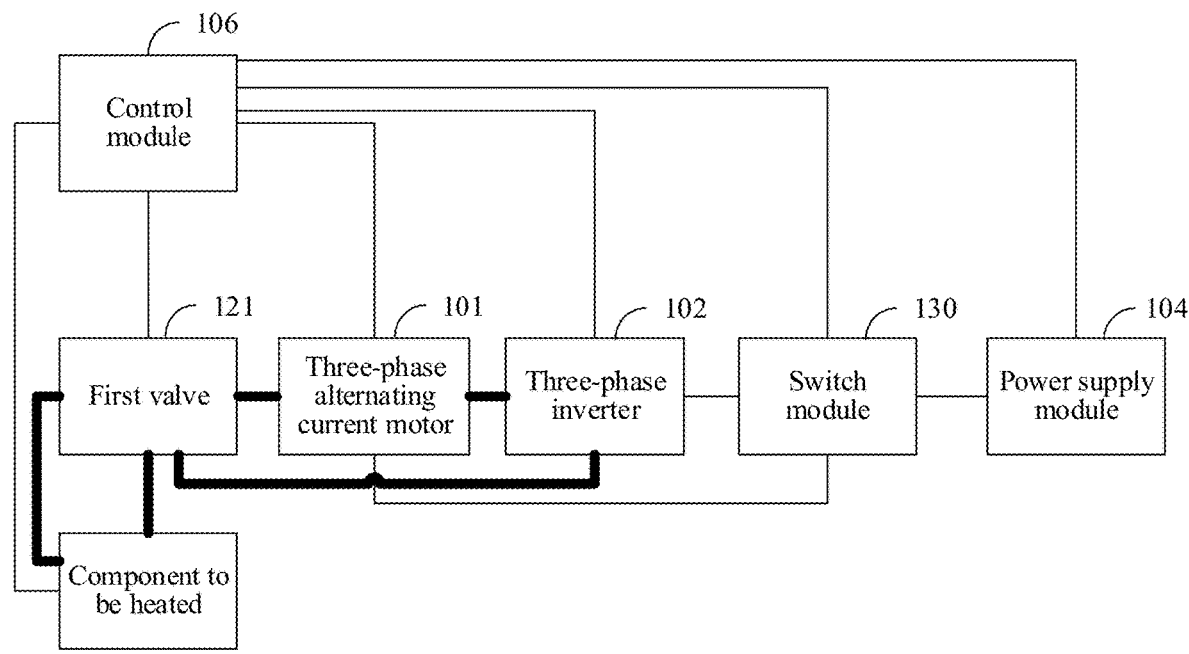
FIG. 1 is a schematic structure diagram of a temperature control device of a vehicle according to one embodiment of the present disclosure.

One embodiment of the present disclosure provides a temperature control device 100 of a vehicle 200. As shown in FIG. 1, the temperature control device 100 includes a motor control circuit and a heat exchange medium circulation loop. The motor control circuit includes a three-phase inverter 102, a three-phase alternating current motor 101, a switch module 130, and a control module 106. The motor control circuit is connected to a power supply module 104 through the switch module 130. Three phases of coils of the three-phase alternating current motor 101 are connected to three phases of bridge legs of the three-phase inverter 102. A common contact of the three phases of coils of the three-phase alternating current motor 101 is connected to the switch module 130. The control module 106 is connected to the switch module 130, the three-phase inverter 102, the three-phase alternating current motor 101, and the power supply module 104.

The heat exchange medium circulation loop includes an electrically driven cooling loop, a cooling loop, and a first valve 121 electrically connected to the control module 106. At least one of the three-phase inverter 102 and the three-phase alternating current motor 101 and the first valve 121 form the electrically driven cooling loop through a heat exchange medium pipeline. The first valve 121 and a component to be heated form the cooling loop through a heat exchange medium pipeline.

When obtaining that the component to be heated needs to be heated, the control module controls the switch module 130 to be turned on, controls the first valve 121 to turn on the electrically driven cooling loop and the cooling loop, and enables the power supply module 104 to charge and discharge the three phases of coils alternately by controlling the three-phase inverter 102, so that the three-phase inverter 102 and the three-phase alternating current motor 101 heat a heat exchange medium flowing through at least one of the three-phase inverter 102 and the three-phase alternating current motor via the electrically driven cooling loop. Furthermore, when the heated heat exchange medium flows through the component to be heated via the cooling loop, the temperature of the component to be heated is increased.

In FIG. 1, a thick solid line represents a heat exchange medium pipeline, and a thin solid line represents a control signal wire or a power wire. The heat exchange medium in the electrically driven cooling loop and the cooling loop may be driven by a driving module to circulate in the loops. For example, a water pump is controlled to output cooling liquid, and the cooling liquid in the electrically driven cooling loop and the cooling loop are driven to circulate. The first valve is a valve with multiple passages, e.g., an electronic four-way valve, which can communicate the electrically driven cooling loop with the cooling loop according to a control signal. The power supply module may be an external power supply module, e.g., a charger such as a charging pile, or an on-board power supply module. For example, the power supply module may be an engine generator or a power battery. The three-phase inverter 102 includes six power switch units, which may be device types such as transistors, IGBTs, and MOS tubes. Every two power switch units form one phase of bridge leg, and there are three phases of bridge legs in total. A connection point of the two power switch units in each phase of bridge leg is connected to one phase of coil in the three-phase alternating current motor 101.

Figure 2:
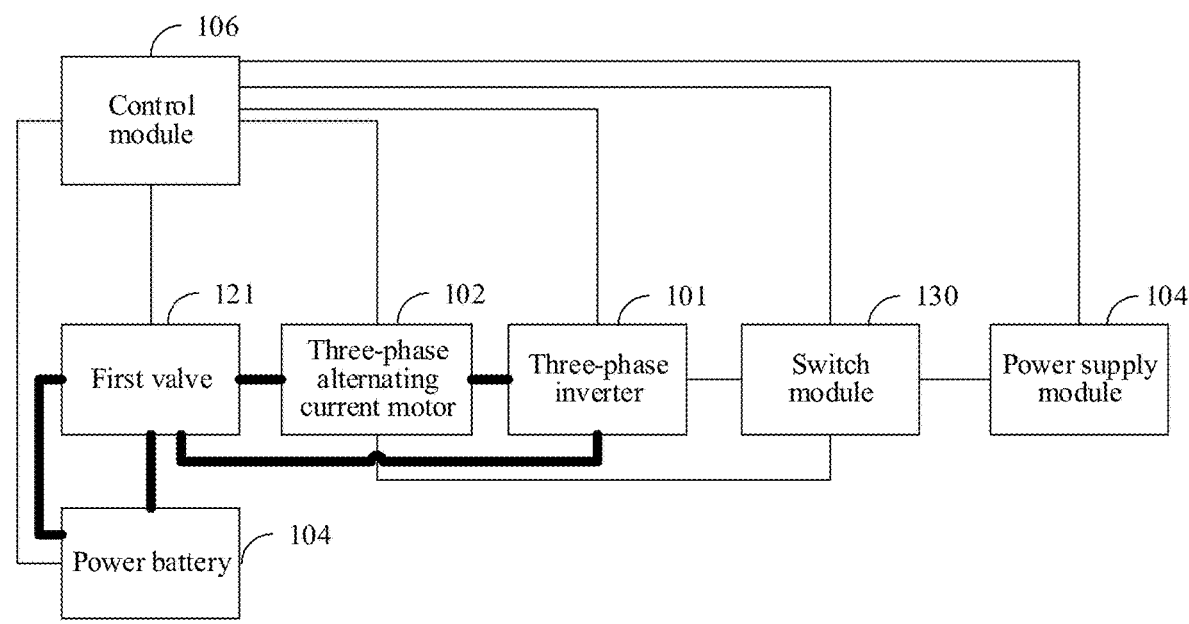
FIG. 2 is another schematic structure diagram of the temperature control device of a vehicle according to one embodiment of the present disclosure.

As shown in FIG. 2, the component to be heated may be a power battery 104, and the first valve 121 and the power battery 104 form a battery cooling loop through a heat exchange medium pipeline. When the control module obtains that the component to be heated needs to be heated, it is indicated that the temperature of the power battery is low or a controller preheats the power battery in advance before the vehicle 200 is started. In a low-temperature charging state of an electric vehicle, the control module 106 determines whether the temperature of the cooling liquid in the electrically driven cooling loop is greater than the temperature of the power battery 104 when determining that the power battery 104 is low in temperature and needs to be heated, i.e., when obtaining that the temperature of the power battery 104 is lower than a first preset temperature. If the temperature of the cooling liquid is greater than the temperature of the power battery 104, it is indicated that the cooling liquid may be used to increase the temperature of the power battery 104, i.e., the cooling liquid under the residual heat of the three-phase alternating current motor 101 may be used to heat the power battery 104. At this moment, the first valve 121 is controlled to be turned on, the electrically driven cooling loop and the battery cooling loop are connected together in series, the cooling liquid heated up in the electrically driven cooling loop enters the battery cooling loop through the first valve 121, and thus heat is transferred to the power battery 104 to achieve the purpose of heating the power battery 104. If the temperature of the cooling liquid is not greater than the temperature of the power battery 104, the three-phase inverter 102 and the three-phase alternating current motor 101 are controlled to heat the cooling liquid in the battery cooling loop, the temperature of the cooling liquid is increased, the electrically driven cooling loop and the battery cooling loop are connected in series, the cooling liquid heated up in the electrically driven cooling loop enters the battery cooling loop through the first valve 121, and thus heat is transferred to the power battery 104 to achieve the purpose of heating the power battery 104.

According to embodiments of the present disclosure, a vehicle original heat management solution is slightly modified, the series connection of the electrically driven cooling loop and the cooling loop is realized by just adding the first valve 121, and a battery heater is replaced with heat generated by a motor. According to the technical solution, the cost of a solution for heating a component to be heated can be effectively reduced, and the utilization efficiency of parts can be improved.

According to some embodiments of the present disclosure, after controlling the first valve 121 to be turned on to make the cooling liquid in the electrically driven cooling loop flow into the battery cooling loop, the control module 106 controls the three-phase inverter 102 and the three-phase alternating current motor 101 to stop heating when obtaining that the temperature of the power battery 104 reaches a second preset temperature, and the control module 106 controls the first valve 121 to continuously turn on the electrically driven cooling loop and the battery cooling loop. The second preset temperature is greater than the first preset temperature.

When the control module 106 determines that the temperature of the power battery 104 rises to a certain temperature, the control module 106 sends a heating stop command to the three-phase inverter 102. At this moment, the motor heating is finished. The state of the first valve 121 is kept unchanged when the motor heating is finished, and the cooling liquid in the electrically driven cooling loop is continuously led into the battery cooling loop so as to continuously heat the power battery.

According to some embodiments of the present disclosure, the control module 106 controls the first valve 121 to be turned off when obtaining that the temperature of the power battery 104 reaches a third preset temperature. The third preset temperature is greater than the second preset temperature.

In the process of heating the power battery 104 by the cooling liquid, the control module 106 controls the first valve 121 to be switched to an original state when determining that the temperature of the power battery 104 is consistent with the temperature of the cooling liquid, thereby finishing the heating of the power battery 104.

Figure 3:
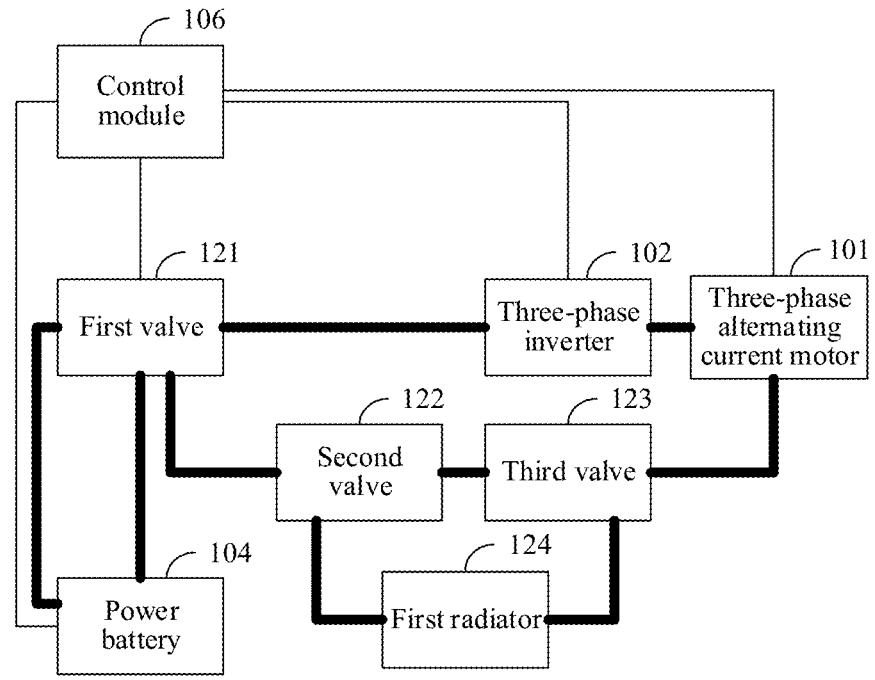
FIG. 3 is another schematic structure diagram of the temperature control device of a vehicle according to one embodiment of the present disclosure.

In another implementation, as shown in FIG. 3, the heat exchange medium circulation loop further includes a second valve 122, a third valve 123, and a first radiator 124. The second valve 122 and the third valve 123 are both electrically connected to the control module 106. The second valve 122 and the third valve 123 are located in the electrically driven cooling loop. The second valve 122, the third valve 123, and the first radiator 124 form a cooling heat dissipation loop. The control module 106 controls the first valve 121, the second valve 122, and the third valve 123 to turn on the electrically driven cooling loop, the battery cooling loop, and the cooling heat dissipation loop when obtaining that the temperature of the power battery 104 is higher than a fourth preset temperature, so that the first radiator 124 cools the heat exchange medium flowing through the cooling heat dissipation loop, and when the cooled heat exchange medium flows through the power battery, the temperature of the power battery is reduced. The fourth preset temperature is greater than the first preset temperature.

The second valve 122 and the third valve 123 may be three-way valves, and the first radiator may be an electronic fan. When the temperature of the power battery 104 is too high, the first valve 121 is controlled to be turned on so that the cooling liquid in the battery cooling loop flows into the electrically driven cooling loop. When the second valve 122 and the third valve 123 are turned on, the heat exchange medium in the battery cooling loop flows into the cooling heat dissipation loop through the electrically driven cooling loop. The electronic fan provided in the cooling heat dissipation loop is used to perform heat dissipation on the heat exchange medium, so that the heat dissipation effect of the electronic fan realizes heat dissipation for the power battery 104.

In the embodiments of the present disclosure, when obtaining that the temperature of the power battery is low, the control module controls the three-phase inverter to generate three-phase currents in different states according to the heating requirements of the power battery, and controls the heating power of the three-phase alternating current motor to achieve the purpose of controlling the heating rate of the power battery. The three-phase alternating current motor may work in a motor winding heat generation mode under the working conditions such as charging and parking, and energy required by the heat generation of the three-phase alternating current motor may come from a power battery pack or an external power supply module. According to the technical solution, the energy source and the heating power can be flexibly adjusted, and thus different power battery heating effects can be achieved. Meanwhile, according to the technical solution, the temperature of the three-phase inverter, the three-phase alternating current motor, the power battery, and the heat exchange medium can be monitored in real time, and the heating power can be adjusted in real time based on the temperature of parts or the temperature of the heat exchange medium, ensuring safe, efficient, and reliable heating function of the three-phase alternating current motor.

Figure 4:
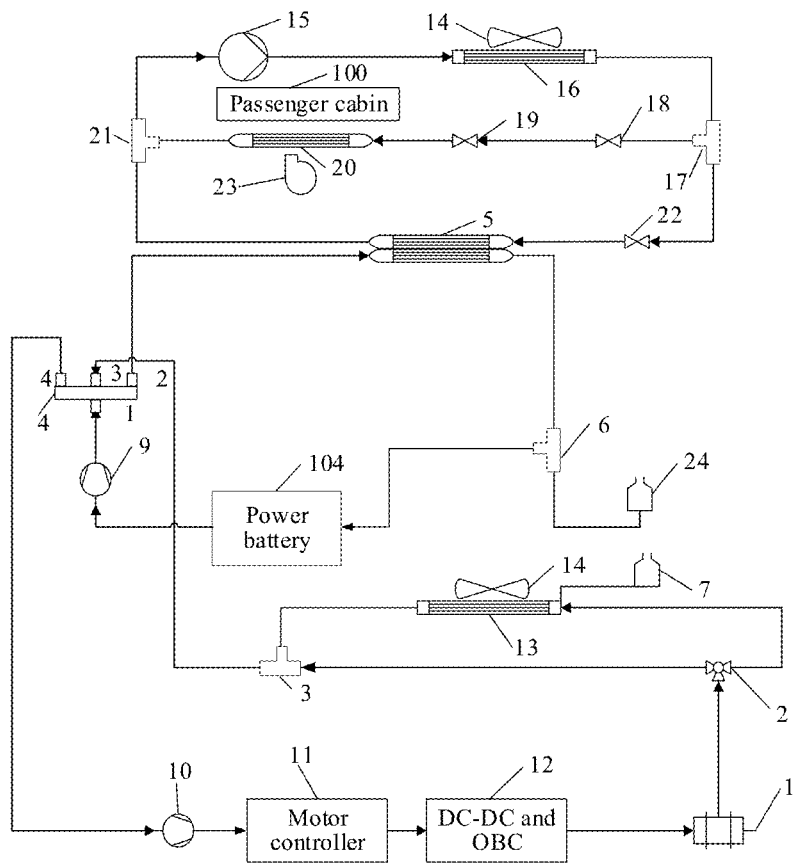
FIG. 4 is a structure diagram of the temperature control device of a vehicle according to one embodiment of the present disclosure.

Hereinafter, one embodiment of the present disclosure will be described in detail through a specific structure. FIG. 4 is a system structure diagram of a temperature control device 100 according to one embodiment of the present disclosure. The first valve 121 is an electronic four-way valve 4, the three-phase inverter 102 is a motor controller 11, the third valve 123 is an electronic three-way valve 2, the second valve 122 is a three-way pipe 3, the first radiator 124 is a radiator 13, and the three-phase alternating current motor 101 is a motor 1. Therefore, a 4th port of the electronic four-way valve 4, a water pump 10, the motor controller 11, a DC-DC and OBC 12, the three-phase alternating current motor 101, the electronic three-way valve 2, the three-way pipe 3, and a 3rd port of the electronic four-way valve 4 are sequentially connected to form an electrically driven cooling loop, the three-way pipe 3, the motor radiator 13, and the electronic three-way valve 2 form a cooling heat dissipation loop, a high-pressure system cooling liquid kettle 7 performs filling into the motor radiator 13 through a pipeline, a 1st port of the electronic four-way valve 4, a battery heat management water pump 9, the power battery 104, a three-way pipe 6, a plate heat exchanger 5, and a 2nd port of the electronic four-way valve 4 form a battery cooling loop, and the three-way pipe 6 is also connected to a battery cooling liquid kettle 24. The plate heat exchanger 5, a three-way pipe 21, an electric compressor 15, an air-conditioning condenser 16, a three-way pipe 17, an electromagnetic valve 18, a thermal expansion valve 19, an air-conditioning evaporator 20, a ventilation heating module 23, and the three-way pipe 21 form a passenger cabin air-conditioning loop. The ventilation heating module 23 includes a blower and a heater. The three-way pipe 21, the electric compressor 15, the air-conditioning condenser 16, the three-way pipe 17, an electronic expansion valve 22, the plate heat exchanger 5, and the three-way pipe 21 form an air-conditioning heat exchange loop. The structure can implement the following modes: a mode of controlling the motor to actively generate heat for battery heating, a motor residual heat utilization mode, a low-temperature battery heat dissipation mode, and a passenger cabin heating mode, which are specifically described below.

In the mode of controlling motor actively generate heat for battery heating mode, in a low-temperature charging state of the vehicle 200, when the control module 106 determines that the battery is low in temperature and needs to be heated, a manager sends a heating request and command, and the motor starts heating. The control module 106 determines a battery temperature, an electric control water temperature, the temperatures of various components of the motor, and the like as action conditions of the electronic four-way valve 4, when the heating conditions of the power battery 104 are satisfied, the electronic four-way valve 4 acts by receiving a control signal sent by the control module 106, and the electronic three-way valve 2 acts to short circuit the electrically driven radiator so as to avoid heat loss generated by the motor. Meanwhile, the electronic four-way valve 4 acts to connect the electrically driven cooling loop and the battery cooling loop in series, the cooling liquid heated up in the electrically driven cooling loop enters the battery cooling loop through a valve body, and thus heat is transferred to the battery to achieve the purpose of heating the battery. When the control module 106 determines that the temperature of the power battery 104 rises to a certain temperature, the control module 106 sends a heating stop command to the motor controller. At this moment, motor heating is finished. The state of the electronic four-way valve 4 is unchanged when the motor heating is finished, and the cooling liquid in the electrically driven cooling loop is continuously led into the battery cooling loop. When the control module 13 determines that a maximum temperature of the power battery is consistent with the electric control water temperature, the control module 13 sends an action command of the electronic four-way valve 4, and the electronic four-way valve 4 is switched back to an original state. In the motor heating mode, a heating system loop is that the cooling liquid sequentially passes through the power battery 104, the battery heat management water pump 9, the electronic four-way valve 4 (1st port and 4th port), the water pump 10, the motor controller 11, the DC-DC and OBC 12, the motor 1, the electronic three-way valve 2, the three-way pipe 3, the electronic four-way valve 4 (3rd port and 2nd port), the plate heat exchanger 5, and the three-way pipe 6, and then returns to the power battery 104. Meanwhile, the battery cooling liquid kettle 24 performs cooling liquid filling to participate in circulation.

In the motor residual heat utilization mode, when the vehicle 200 is in a low-temperature driving state or a static state, the control module 106 sends a heating request and command when determining that the power battery 104 is low in temperature and needs to be heated, the control module 106 determines a battery temperature, an electric control water temperature, the temperatures of various components of the motor, and the like as action conditions of the electronic four-way valve 4, when the heating conditions of the battery are satisfied, the electronic four-way valve 4 acts by receiving a controller signal, the electronic four-way valve 4 acts to connect the electrically driven cooling loop and the battery cooling loop in series, the cooling liquid heated up in a motor cooling flow channel enters the battery cooling loop through the electronic four-way valve 4, and thus heat is transferred to the battery to achieve the purpose of heating the battery. In the motor residual heat utilization mode, the heating system loop is that the cooling liquid sequentially passes through the power battery 104, the battery heat management water pump 9, the electronic four-way valve 4 (1st port and 4th port), the water pump 10, the motor controller 11, the DC-DC and OBC 12, the motor 1, the electronic three-way valve 2, the three-way pipe 3, the electronic four-way valve 4 (3rd port and 2nd port), the plate heat exchanger 5, and the three-way pipe 6, and then returns to the power battery 104.

In the low-temperature battery heat dissipation mode, when the vehicle 200 drives or is charged in a low-temperature environment, the control module 106 sends a command when the control module 106 determines that the battery temperature is too high and there is a cooling requirement, an air-conditioning controller controls a four-way valve to act, the radiator is normally turned on, the battery cooling loop and the electrically driven cooling loop are connected in series, the motor temperature is low at a low temperature, hotter cooling liquid in a battery pack is led into the electrically driven cooling loop, and thus the heat dissipation of the battery pack is achieved by utilizing the heat dissipation effect of a cooling fan. In the low-temperature battery heat dissipation mode, a heat dissipation loop is that the cooling liquid sequentially passes through the power battery 104, the battery heat management water pump 9, the electronic four-way valve 4 (1st port and 4th port), the water pump 10, the motor controller 11, the DC-DC and OBC 12, the motor 1, the electronic three-way valve 2, the radiator 13, the three-way pipe 3, the electronic four-way valve 4 (3rd port and 2nd port), the plate heat exchanger 5, and the three-way pipe 6, and then returns to the power battery 104. Meanwhile, the battery cooling liquid kettle 24 performs cooling liquid filling to participate in circulation.

In the passenger cabin heating mode, when a passenger cabin has heating requirements, the ventilation heating module 23 can heat air passing through the module, thereby achieving the purpose of heating, which is applied to driving and charging working conditions.

Figure 5:
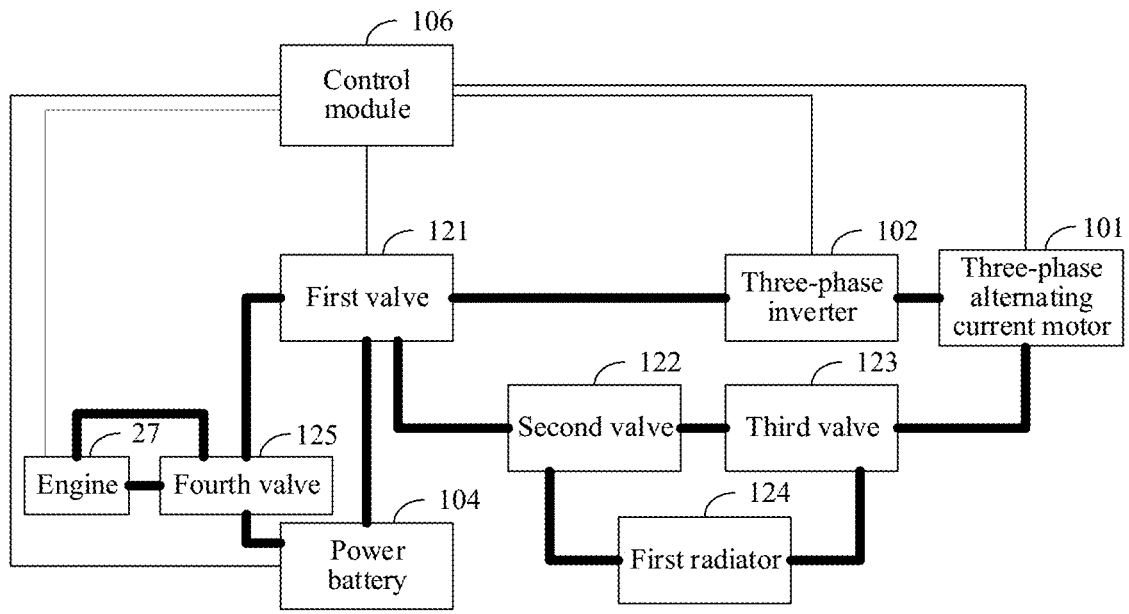
FIG. 5 is a schematic structure diagram of a temperature control device of a vehicle according to another embodiment of the present disclosure.

Another embodiment of the present disclosure provides a temperature control device 100 of a vehicle 200. As shown in FIG. 5, the structure of forming the electrically driven cooling loop is similar to that shown in FIG. 4. The heat exchange medium circulation loop further includes a fourth valve 125 and an engine 27 which are connected to the control module 106 respectively. The fourth valve 125 is located in the battery cooling loop. The fourth valve 125 and the engine 27 form an engine 27 cooling loop. The control module 106 controls the fourth valve 125 to turn on the battery cooling loop and the engine cooling loop when obtaining that the temperature of the engine 27 is lower than a fifth preset temperature, so that the engine 27 and the power battery 104 exchange heat by a heat exchange medium flowing through the battery cooling loop and the engine cooling loop.

When the engine needs to be started under the low-temperature condition, the engine can be preheated with the cooling liquid in the battery cooling loop and is then started, and the engine may be warmed up while the battery is heated in a charging state.

Figure 6:
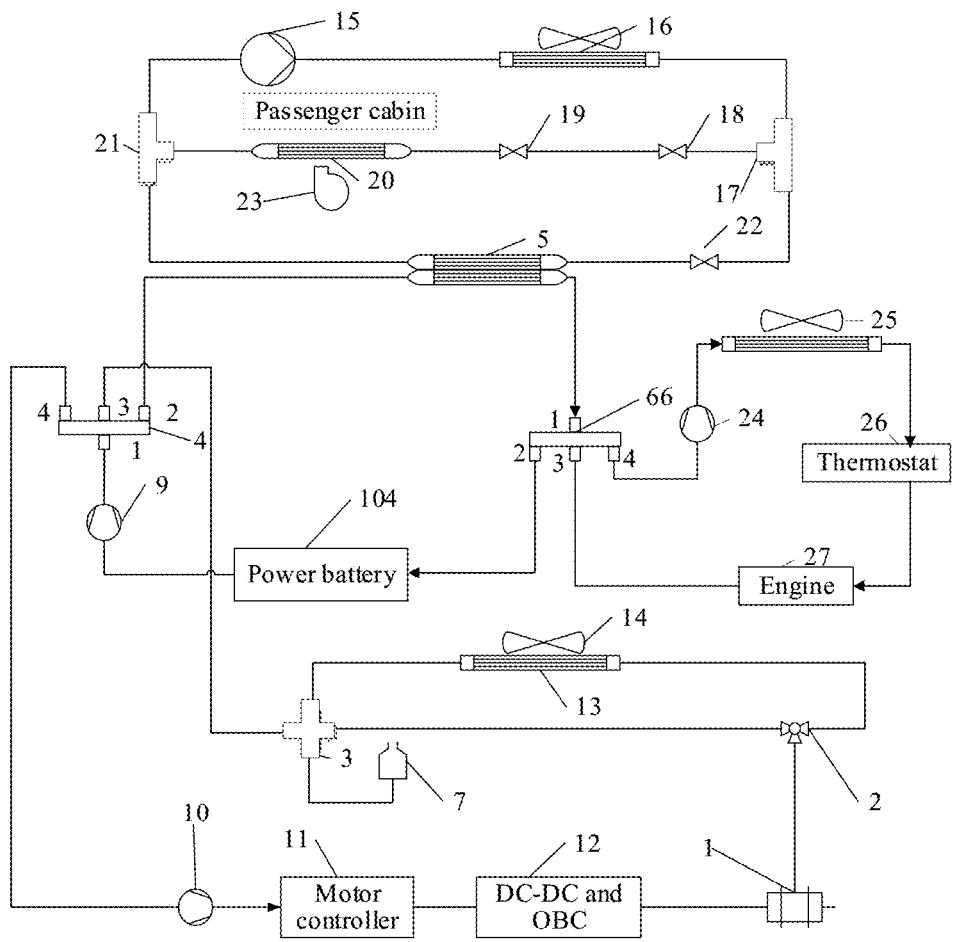
FIG. 6 is a structure diagram of the temperature control device of a vehicle according to another embodiment of the present disclosure.

Hereinafter, another embodiment of the present disclosure will be described in detail through a specific structure. FIG. 6 is a specific structure diagram of the temperature control device 100 in FIG. 5. The first valve 121 is an electronic four-way valve 4, the three-phase inverter 102 is a motor controller 11, the third valve 123 is an electronic three-way valve 2, the second valve 122 is a four-way pipe 3, the first radiator 124 is a radiator 13, the fourth valve 125 is an electronic four-way valve 66, and the three-phase alternating current motor 101 is a motor 1. Therefore, a 4th port of the electronic four-way valve 4, a water pump 10, the motor controller 11, a DC-DC and OBC 12, the motor 1, the electronic three-way valve 2, the four-way pipe 3, and a 3rd port of the electronic four-way valve 4 are sequentially connected to form an electrically driven cooling loop. The four-way pipe 3, the radiator 13, and the electronic three-way valve 2 form a cooling heat dissipation loop. A 1st port of the electronic four-way valve 4, a battery heat management water pump 9, the power battery 104, a 1st port and a 2nd port of the electronic four-way valve 66, a plate heat exchanger 5, and a 2nd port of the electronic four-way valve 4 form a battery cooling loop. A 4th port of the electronic four-way valve 66, a cooling liquid water pump 24, an engine radiator 25, a thermostat 26, an engine 27, and a 3rd port of the electronic four-way valve 66 form an engine cooling loop. The plate heat exchanger 5, the three-way pipe 21, the electric compressor 15, the air-conditioning condenser 16, the three-way pipe 17, the electromagnetic valve 18, the thermal expansion valve 19, the air-conditioning evaporator 20, and the three-way pipe 21 form a passenger cabin air-conditioning loop. The three-way pipe 21, the electric compressor 15, the air-conditioning condenser 16, the three-way pipe 17, the electronic expansion valve 22, the plate heat exchanger 5, and the three-way pipe 21 form an air-conditioning cooling loop. The structure may implement the following modes: a mode of controlling the motor to actively generate heat for battery heating, a motor residual heat utilization mode, a low-temperature battery heat dissipation mode, a passenger cabin heating mode, and an engine preheating mode.

The mode of controlling the motor to actively generate heat for battery heating, the motor residual heat utilization mode, the low-temperature battery heat dissipation mode, and the passenger cabin heating mode are the same as those described above. Descriptions are omitted herein.

In the engine preheating mode, when the electric vehicle is switched from an EV mode to an HEV mode in the driving process, the engine can be heated by the cooling liquid electrically controlled by the motor, the cooling liquid of a battery pack loop is led into an engine loop through the electronic four-way valve 66 when the engine needs to be warmed up, the motor radiator can be short-circuited through the three-way valve 2, and thus the motor and electric control heat losses can be reduced to the maximum extent. The warming loop includes: the motor 1, the electronic three-way valve 2, the four-way pipe 3→the electronic four-way valve 4 (3rd port and 2nd port), the plate heat exchanger 5, the electronic four-way valve 66 (1st port and 4th port), the engine cooling liquid water pump 24, the engine radiator 25, the thermostat 26, the engine 27→the electronic four-way valve 66 (3rd port and 2nd port), the power battery 104, the battery heat management water pump 9→the electronic four-way valve 4 (1st port and 4th port), the water pump 10, the motor controller 11, the DC-DC and OBC 12, and the motor 1. When the engine warming requirement is satisfied, the electronic four-way valve is switched to the original state.

Figure 7:
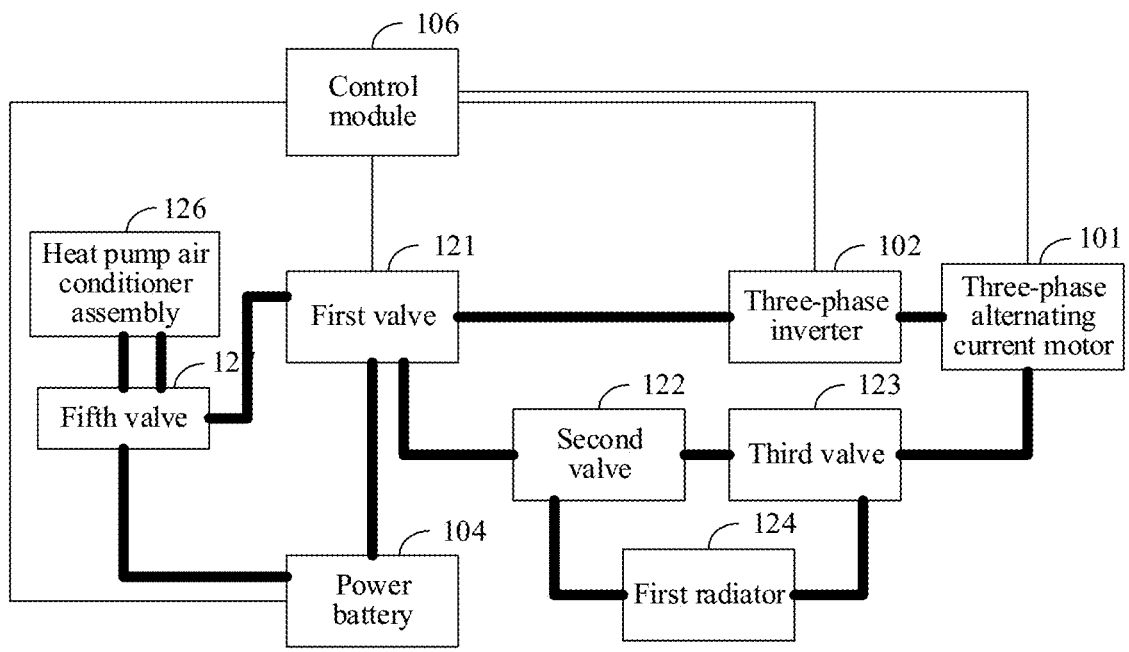
FIG. 7 is a schematic structure diagram of a temperature control device of a vehicle according to another embodiment of the present disclosure.

Another embodiment of the present disclosure provides a temperature control device 100 of a vehicle 200. As shown in FIG. 7, the structure of forming the electrically driven cooling loop is similar to that shown in FIG. 4. Descriptions are omitted herein. The difference lies in that the heat exchange medium circulation loop further includes a fifth valve 127 and a heat pump air conditioner assembly 126. The fifth valve 127 and the heat pump air conditioner assembly 126 are both electrically connected to the control module 106. The fifth valve 127 is connected to the first valve 121 through a heat exchange medium pipeline. The fifth valve 127 and the heat pump air conditioner assembly form an air-conditioning heating loop through a heat exchange medium pipeline. The fifth valve 127, the power battery 104, and the first valve 121 form a battery cooling loop.

The control module 106 controls the fifth valve 127 to communicate the air-conditioning heating loop with the battery cooling loop when receiving an air-conditioning heating instruction, so that the heat pump air conditioner assembly 126 and the power battery 104 exchange heat by a heat exchange medium flowing through the air-conditioning heating loop and the battery cooling loop.

The control module 106 controls the heat pump air conditioner assembly 126 to work to enable the air-conditioning heating loop to heat a passenger cabin when receiving an air-conditioning heating instruction, and controls the fifth valve 127 to turn on the air-conditioning heating loop and the battery cooling loop when the temperature in the air-conditioning heating instruction is lower than a preset value, so that the heat pump air conditioner assembly 126 and the power battery 104 exchange heat by a heat exchange medium flowing through the air-conditioning heating loop and the battery cooling loop.

The air conditioner assembly 126 may include an air-conditioning water pump, a PTC heater, an air-conditioning radiator, and the like, and may warm or cool the passenger cabin. The fifth valve 127 may be an electronic four-way pipe, the air-conditioning heating loop and the battery cooling loop are connected together by providing the fifth valve 127, the electrically driven cooling loop, the battery cooling loop, and the air-conditioning cooling loop may be connected together by matching the fifth valve 127 with the first valve 121, and then the cooling liquid in the electrically driven cooling loop is input into the air-conditioning cooling loop, thereby realizing the control on the temperature in the passenger cabin through the cooling liquid in the electrically driven cooling loop.

Figure 8:
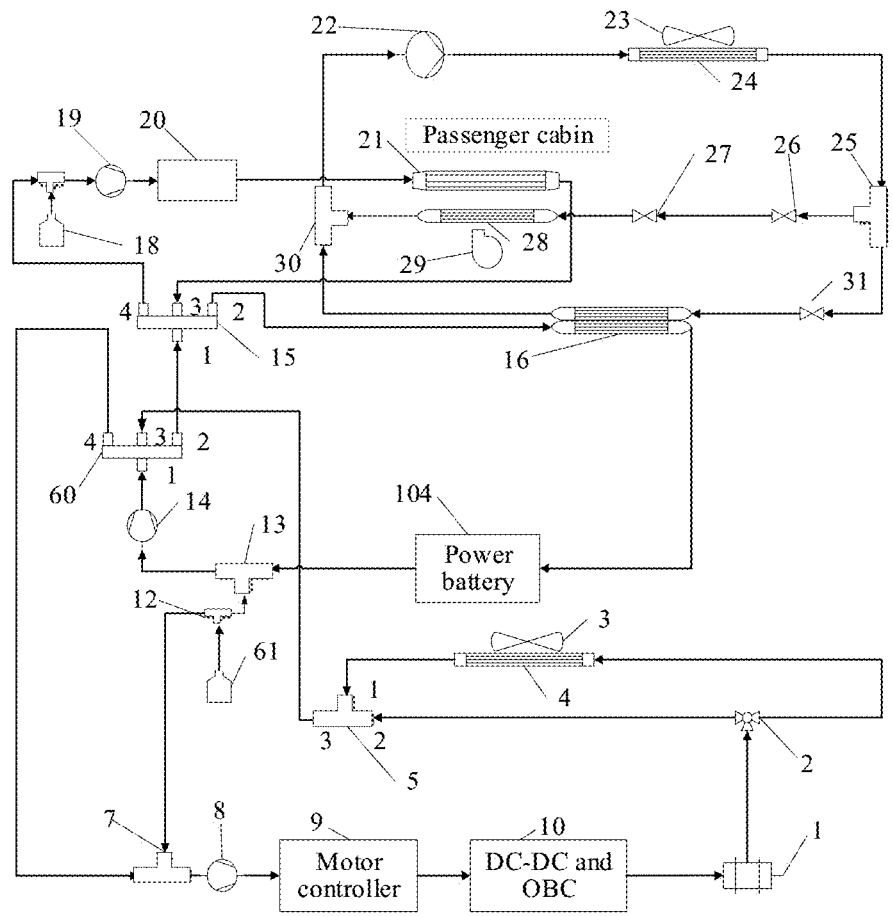
FIG. 8 is a structure diagram of the temperature control device of a vehicle according to another embodiment of the present disclosure.

Hereinafter, another embodiment of the present disclosure will be described in detail through a specific structure. FIG. 8 is a structure diagram of a temperature control device 100 of a vehicle 200 according to another embodiment of the present disclosure. The first valve 121 is an electronic four-way valve 60, the three-phase inverter 102 is a motor controller 9, the third valve 123 is an electronic three-way valve 2, the second valve 122 is a three-way pipe 3, the first radiator 124 is a motor radiator 4, and the fifth valve 127 is an electronic four-way valve 15. Therefore, a 4th port of the electronic four-way valve 60, a three-way pipe 7, a water pump 8, the motor controller 9, a DC-DC and OBC 10, a motor 1, the electronic three-way valve 2, a three-way pipe 5, and a 3rd port of the electronic four-way valve 60 are sequentially connected to form an electrically driven cooling loop, the three-way pipe 3, the motor radiator 4, and the electronic three-way valve 2 form a cooling heat dissipation loop, and a 1st port of the electronic four-way valve 60, a battery heat management water pump 14, a three-way pipe 13, the power battery 104, a plate heat exchanger 16, a 2nd port of the electronic four-way valve 15, a 1st port of the electronic four-way valve 15, and a 2nd port of the electronic four-way valve 60 form a battery cooling loop. The three-way pipe 7 is connected to the three-way pipe 13 through a three-way pipe 12, and a cooling liquid kettle 61 respectively realizes filling of a cooling system and a battery system. A three-way pipe 30, an electric compressor 22, a radiator assembly 24, a three-way pipe 25, an electronic expansion valve 31, the plate heat exchanger 16, and the three-way pipe 30 form an air-conditioning cooling loop. The electric compressor 22, the radiator assembly 24, the three-way pipe 25, an electromagnetic valve 26, a thermal expansion valve 27, an air-conditioning radiator 28, and the three-way pipe 30 form a passenger cabin air-conditioning loop. A 4th port of the electronic four-way valve 15, an auxiliary water tank 18, an air-conditioning water pump 19, a PTC heater 20, an air-conditioning radiator 21, and a 3rd port of the electronic four-way valve 15 are sequentially connected to form an air-conditioning heating loop. The structure may implement the following modes: a mode of controlling a motor to actively generate heat for battery heating, a motor residual heat utilization mode, a low-temperature battery heat dissipation mode, and a passenger cabin heating mode.

In the motor active heat generation battery heating mode, in a low-temperature charging state of the vehicle 200, when the control module 106 determines that the battery is low in temperature and needs to be heated, the control module 106 sends a heating request and command, and the motor starts heating. The control module 106 determines a battery temperature, an electric control water temperature, the temperatures of various components of the motor, and the like as action conditions of the electronic four-way valve 60, when the heating conditions of the power battery 104 are satisfied, the electronic four-way valve 60 acts by receiving a signal from the control module 106, the electrically driven cooling loop and the battery cooling loop are connected in series, the cooling liquid heated up in a motor cooling flow channel enters the battery cooling loop through a valve body, and heat is transferred to the power battery 104 to achieve the purpose of heating the power battery 104. When the control module 106 determines that the battery temperature rises to a certain temperature, the control module 106 sends a heating stop command to the motor controller. At this moment, motor heating is finished. The state of the valve body is unchanged when the motor heating is finished, and the cooling liquid in the electrically driven cooling loop is continuously led into the battery cooling loop. When a manager determines that the maximum temperature of the battery is consistent with the electric control water temperature, the manager sends a valve body action command, the air-conditioning controller receives the command, and the electronic four-way valve is switched back to the original state. In a motor heating mode, a heating system loop includes: the motor 1, the electronic three-way valve 2, the three-way pipe 5, the electronic four-way valve 60 (3rd port and 2nd port), the electronic four-way valve 15 (1st port and 2nd port), the plate heat exchanger 16, the power battery 104, the three-way pipe 13, the battery heat management water pump 14, the electronic four-way valve 60 (1st port and 4th port), the three-way pipe 7, the water pump 8, the motor controller 9, the DC-DC and OBC 10, and the motor 1.

In the motor residual heat utilization mode, when the vehicle 200 is in a low-temperature driving state or a P-gear static state, the control module 106 sends a heating request and command when the control module 106 determines that the battery is low in temperature and needs to be heated, and determines the temperature of the power battery 104, an electric control water temperature, the temperatures of various components of the motor, and the like as action conditions of the electronic four-way valve, when the heating conditions of the battery are satisfied, the valve body acts by receiving a controller signal, the electronic four-way valve acts to connect the electrically driven cooling loop and the battery cooling loop in series, the cooling liquid heated up in the electrically driven cooling loop of the motor enters the battery cooling loop through the valve body, and thus heat is transferred to the battery to achieve the purpose of heating the battery. In the motor residual heat utilization mode, a heating system loop includes: the motor 1, the electronic three-way valve 2, the three-way pipe 5, the electronic four-way valve 60 (3rd port and 2nd port), the electronic four-way valve 15 (1st port and 2nd port), the plate heat exchanger 16, the power battery 104, the three-way pipe 13, the battery heat management water pump 14, the electronic four-way valve 60 (1st port and 4th port), the three-way pipe 7, the water pump 8, the motor controller 9, the DC-DC and OBC 10, and the motor 1.

In the low-temperature battery heat dissipation mode, when the vehicle 200 drives or is charged in a low-temperature environment, the manager sends a command when the electrically driven cooling loop determines that the temperature of the power battery 104 is too high and there is a cooling requirement, an air-conditioning controller controls a four-way valve to act, the radiator is normally turned on, the battery cooling loop and the electrically driven cooling loop are connected in series, the motor temperature is low at a low temperature, hotter cooling liquid in a battery pack is led into the electrically driven cooling loop, and thus the heat dissipation of the battery pack is achieved by utilizing the heat dissipation effect of a cooling fan. In the low-temperature heat dissipation mode, a heating system loop includes: the motor 1, the electronic three-way valve 2, the motor radiator 4, the three-way pipe 5, the electronic four-way valve 60 (3rd port and 2nd port), the electronic four-way valve 15 (1st port and 2nd port), the plate heat exchanger 16, the power battery 104, the three-way pipe 13, the battery heat management water pump 14, the electronic four-way valve 60 (1st port and 4th port), the three-way pipe 7, the water pump 8, the motor controller 9, the DC-DC and OBC 10, and the motor 1.

In the passenger cabin heating mode, the present disclosure is matched with air-conditioning wind heating, and can achieve the purpose of heating by air-conditioning wind heating, which is applied to driving and charging working conditions. Residual heat in an electric control water channel may also be used for auxiliary heating of a passenger cabin, and energy generated by the motor is effectively utilized for driving and charging working conditions. In the passenger cabin heating mode, a heating system loop includes: the motor 1, the electronic three-way valve 2, the three-way pipe 5, the electronic four-way valve 60 (3rd port and 2nd port), the electronic four-way valve 15 (1st port and 4th port), the air-conditioning water pump 19, the PTC heater 20, the air-conditioning radiator 21, the electronic four-way valve 15 (3rd port and 2nd port), the plate heat exchanger 16, the power battery 104, the three-way pipe 13, the battery heat management water pump 14, the electronic four-way valve 60 (1st port and 4th port), the three-way pipe 7, the water pump 8, the motor controller 9, the DC-DC and OBC 10, and the motor 1. The passenger cabin heating may be freely switched. In a colder environment, the passenger cabin heating may be switched to a small heating loop for the purpose of faster response to requirements of hot wind, i.e., switched to a loop of the auxiliary water tank 18→the air-conditioning water pump 19→the PTC heater 20→the air-conditioning radiator 21, the 3rd port and the 4th port (3 and 4) of the electronic four-way valve 15, and the air-conditioning water pump 19. When the heat requirements of the passenger cabin are reduced, the heat is transferred into the battery cooling loop for supplying more heat to the battery.

Figure 9:
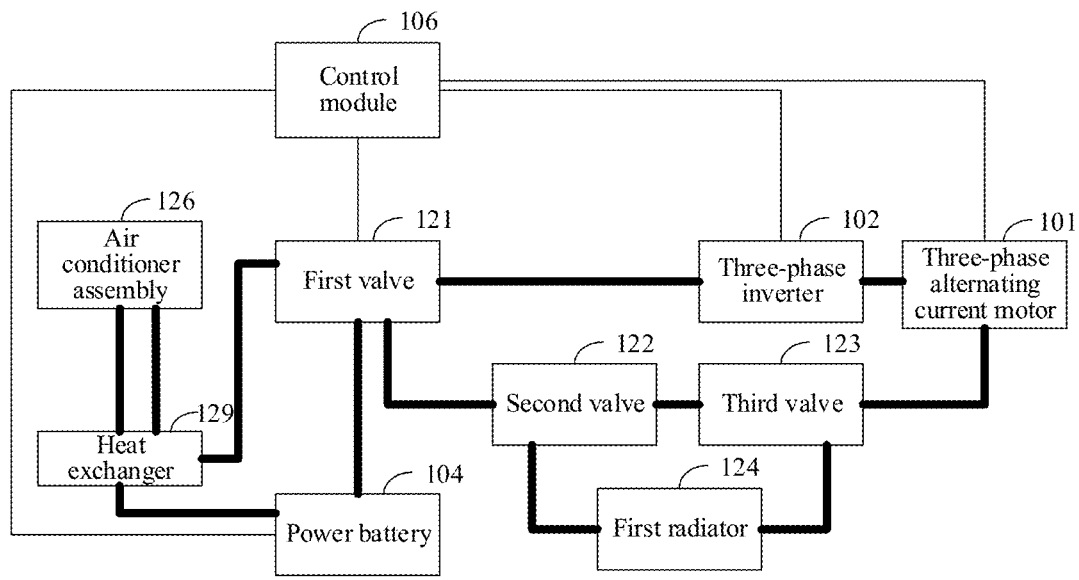
FIG. 9 is a schematic structure diagram of a temperature control device of a vehicle according to another embodiment of the present disclosure.

Another embodiment of the present disclosure provides a temperature control device 100 of a vehicle 200. As shown in FIG. 9, the structure of forming the electrically driven cooling loop is similar to that shown in FIG. 4. The heat exchange medium circulation loop further includes a heat exchanger 129 and an air conditioner assembly 126. The air conditioner assembly 126 is connected to the control module 106. The heat exchanger 129 is located in the battery cooling loop. The heat exchanger 129 and the air conditioner assembly 126 form an air-conditioning cooling loop. A heat exchange medium in the battery cooling loop and a heat exchange medium in the air-conditioning cooling loop exchange heat by the heat exchanger 129, so that the air-conditioner assembly 126 and the power battery 104 exchange heat by the heat exchanger 129.

The air conditioner assembly 126 may include an electric compressor, an oil-liquid separator, an inboard condenser, and the like, and may warm or cool the passenger cabin. The heat exchanger 129 may be a plate heat exchanger. The air-conditioning heating loop and the battery cooling loop are connected together by providing the plate heat exchanger, and then the heat of the cooling liquid in the electrically driven cooling loop and the heat in the air-conditioning cooling loop are exchanged, so that the temperature in the passenger cabin can be controlled through the cooling liquid in the electrically driven cooling loop.

Figure 10:
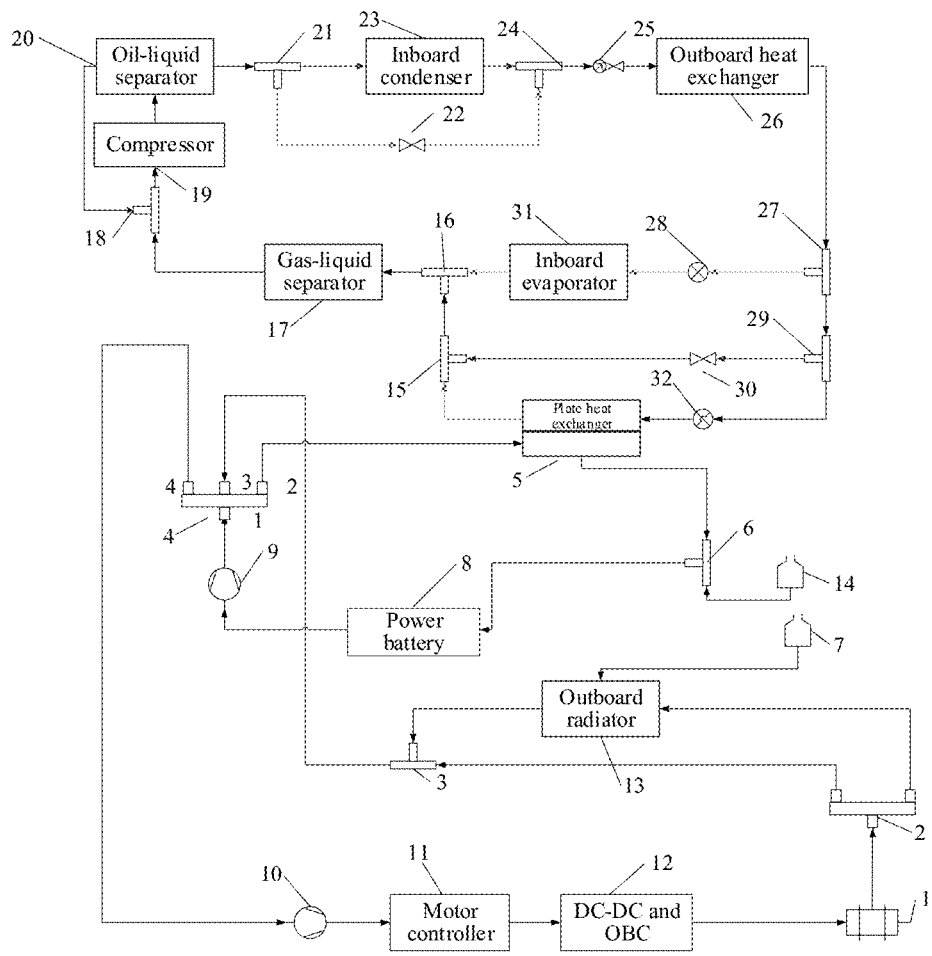
FIG. 10 is a structure diagram of the temperature control device of a vehicle according to another embodiment of the present disclosure.

Hereinafter, the embodiment of the present disclosure will be described in detail through a specific structure. FIG. 10 is a system structure diagram of a temperature control device 100 of a power battery 104 according to one embodiment of the present disclosure. The first valve 121 is an electronic four-way valve 4, the three-phase inverter 102 is a motor controller 11, the third valve 123 is an electronic three-way valve 2, the second valve 122 is a three-way pipe 3, the first radiator 124 is an outboard radiator 13, and the heat exchanger 129 is a plate heat exchanger 5. A 4th port of the electronic four-way valve 4, a water pump 10, the motor controller 11, a DC-DC and OBC 12, the motor 1, the electronic three-way valve 2, the three-way pipe 3, and a 3rd port of the electronic four-way valve 4 are sequentially connected to form an electrically driven cooling loop. The three-way pipe 3, the outboard radiator 13, and the electronic three-way valve 2 form a cooling heat dissipation loop. The outboard radiator 13 is also connected to a high-pressure system cooling liquid kettle 7. A 1st port of the electronic four-way valve 4, a battery heat management water pump 9, the power battery 104, a three-way pipe 6, the plate heat exchanger 5, and a 2nd port of the electronic four-way valve 4 form a battery cooling loop. The three-way pipe 6 is also connected to a battery cooling liquid kettle 14. The plate heat exchanger 5, a three-way pipe 15, a three-way pipe 16, a gas-liquid separator 17, a three-way valve 18, a compressor 19, an oil-liquid separator 20, a three-way pipe 21, an inboard condenser 23, a three-way pipe 24, an electronic electromagnetic three-way valve 25, an outboard heat exchanger 26, a three-way valve 27, a three-way valve 29, and an electronic expansion valve 32 form an air-conditioning cooling loop. The three-way pipe 16, an inboard evaporator 31, an electronic expansion valve 28, and the three-way pipe 27 are sequentially connected. The structure may implement the following modes: a mode of controlling the motor to actively generate heat for battery heating, a motor residual heat utilization mode, a low-temperature battery heat dissipation mode, and a passenger cabin heating mode, which are specifically described below.

The mode of controlling the motor to actively generate heat for battery heating and the motor residual heat utilization mode are the same as those described above. Descriptions are omitted herein.

The low-temperature battery heat dissipation mode may differ: a heat pump may also be used to heat the battery. The air-conditioning cooling loop includes: the plate heat exchanger 5, the three-way pipe 15, the three-way pipe 16, the gas-liquid separator 17, the three-way valve 18, the compressor 19, the oil-liquid separator 20, the three-way pipe 21, the inboard condenser 23, the three-way pipe 24, the electronic electromagnetic three-way valve 25, the outboard heat exchanger 26, the three-way valve 27, the three-way valve 29, the electronic expansion valve 32, and the plate heat exchanger 5.

For passenger cabin heating, heat pump air-conditioning heating is matched, which is applied to driving and charging working conditions. In view of a poor heating effect of a heat pump at a low temperature, motor active heat generation/driving waste heat is added to assist the heat pump in heating the passenger cabin at the low temperature, such that energy generated by the motor is effectively utilized, which is applied to driving and charging working conditions. In the passenger cabin heating mode, a heating system loop includes: the motor 1, the electronic three-way valve 2, the three-way pipe 3, a 3rd port and a 2nd port of the electronic four-way valve 4, the plate heat exchanger 5, the three-way pipe 6, the power battery 104, the battery heat management water pump 9, a 1st port and a 4th port of the electronic four-way valve 4, a water pump 10, a motor controller 11, a DC-DC and OBC 12, and the motor 1. A preheating heat pump system refrigerant loop includes: the three-way pipe 15, the three-way pipe 16, the gas-liquid separator 17, the three-way valve 18, the compressor 19, the oil-liquid separator 20, the three-way pipe 21, the inboard condenser 23, the three-way pipe 24, the electronic electromagnetic three-way valve 25, the outboard heat exchanger 26, the three-way valve 27, the three-way valve 29, an electromagnetic valve 30, and the three-way pipe 15. The compressor 19 is self-heated, and the compressor 19 does not dissipate heat through the inboard evaporator 31 after being started, so that the temperature of the compressor 19 can be rapidly heated to a normal use range in a low-temperature environment, and long-term operation of the compressor 19 in a low-efficiency working condition can be avoided.

The structure and principle of the temperature control device 100 for controlling the motor to actively generate for power battery heating in the above four embodiments are described in detail by taking a specific circuit structure as an example.

Figure 11:
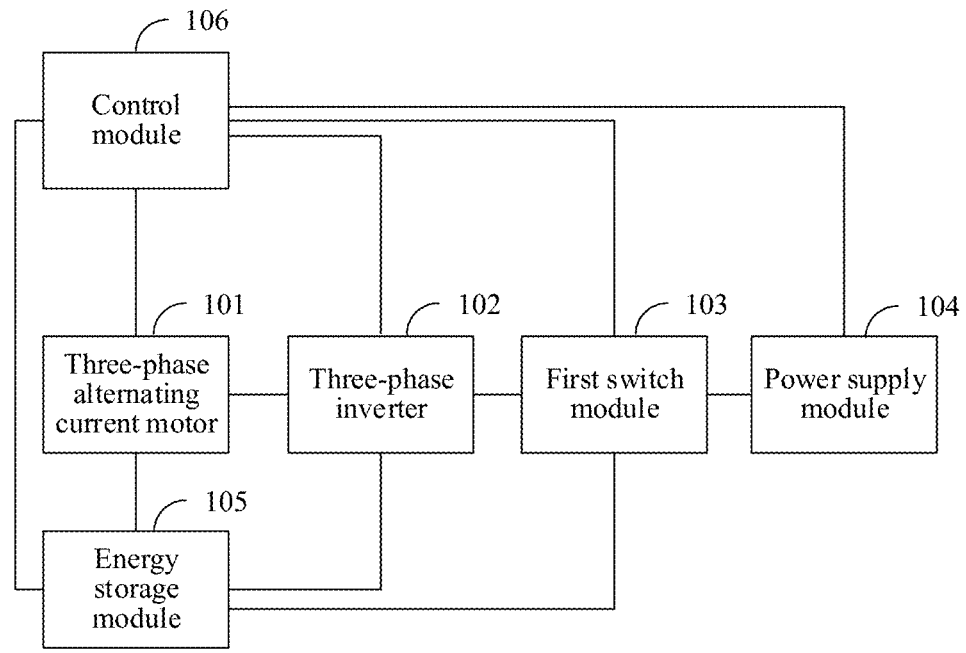
FIG. 11 is a schematic structure diagram of a temperature control device of a vehicle according to another embodiment of the present disclosure.

Another embodiment of the present disclosure provides a temperature control device 100. As shown in FIG. 11, on the basis of embodiments shown in FIG. 4, the motor control circuit further includes an energy storage module 105. The energy storage module 105 is connected to a connection point of the three phases of coils of the three-phase alternating current motor 101, and the energy storage module is further connected to the switch module. The switch module is a first switch module 103. The motor control circuit is connected to the power supply module 104 through the first switch module 103. A first end of the three-phase inverter 102 is connected to a positive end of the power supply module 104, and a second end of the three-phase inverter 102 is connected to a negative end of the power supply module 104. Three phases of coils of the three-phase alternating current motor 101 are connected to three phases of bridge legs of the three-phase inverter 102. A first end of the energy storage module 105 is connected to the first switch module 103 and the three-phase inverter 102, and a second end of the energy storage module 105 is connected to a common contact of the three phases of coils of the three-phase alternating current motor 101. The control module 106 is connected to the first switch module 103, the three-phase inverter 102, the three-phase alternating current motor 101, a component to be heated, and the energy storage module 105.

When detecting that the component to be heated needs to be heated, the control module 106 controls the first switch module 103 to be turned on, controls the energy storage module 105 to be in a working state, and enables the power supply module 104 to charge the energy storage module 105 and the three phases of coils of the three-phase alternating current motor 101 and discharge the energy storage module 105 and the three phases of coils of the three-phase alternating current motor 101 alternately by controlling the three-phase inverter 102, so that the energy storage module 105, the three-phase inverter 102, and the three-phase alternating current motor 101 heat a heat exchange medium flowing through at least one of the energy storage module 105, the three-phase inverter 102, or the three-phase alternating current motor 101, and then the temperature of the component to be heated is increased when the heated heat exchange medium flows through the component to be heated.

The power supply module 104 may be a power supply module inside the vehicle 200 or a power supply module outside the vehicle 200. For example, power supplied by the power supply module 104 may be direct current supplied by a direct current charging pile, direct current output by a single-phase alternating current charging pile and a three-phase alternating current charging pile after rectification, electric energy generated by a fuel cell, power in the form of direct current after a range extender such as an engine rotates to drive a generator to generate power that is rectified by a generator controller, or power supplied by a power battery inside the vehicle 200. The three-phase inverter 102 includes six power switch units, which may be device types such as transistors, IGBTs, and MOS tubes. The two power switch units form one phase of bridge leg, and there are three phases of bridge legs in total. A connection point of the two power switch units in each phase of bridge leg is connected to one phase of coil in the three-phase alternating current motor 101. The three-phase alternating current motor 101 includes three phases of coils which are connected to one point. The three-phase alternating current motor 101 may be a permanent magnet synchronous motor or asynchronous motor, and the three-phase alternating current motor 101 is a three-phase four-wire system, i.e. N wires are led out at a connection point of the three phases of coils, and the N wires and the energy storage module 105 are connected in series to form a connection circuit. The switch module 103 is used to enable the power supply module 104 to be connected to or disconnected from a circuit, and the power supply module 104 may be connected into a charging loop when the power supply module 104 needs to be discharged by controlling the switch module 103. The energy storage module 105 is used to store electric energy output by the power supply module 104. The control module 106 may collect the voltage and current of the power supply module 104, the temperature of the component to be heated, and the phase current of the three-phase alternating current motor 101. The control module 106 may include a vehicle controller, a control circuit of the motor controller, and a BMS battery manager circuit, which are connected through a CAN wire. Different modules in the control module 106 control power switches in the three-phase inverter 102 to be turned on and off according to the obtained information so as to realize the turn-on of different current loops. The component to be heated may be located in the vicinity of the energy storage module 105, the three-phase inverter 102, and the three-phase alternating current motor 101. For example, the component to be heated is located in the same cabin as at least one of the energy storage module 105, the three-phase inverter 102, and the three-phase alternating current motor 101. The heat of at least one of the energy storage module 105, the three-phase inverter 102, and the three-phase alternating current motor 101 may also be transferred to the component to be heated through a heat exchange medium. For example, heat exchange medium pipelines are provided on the energy storage module 105, the three-phase inverter 102, and the three-phase alternating current motor 101. The heat exchange medium flows in the heat exchange medium pipelines, and the temperature of the component to be heated can be adjusted through temperature adjustment of the heat exchange medium in the heat exchange medium pipelines.

N wires are led out of the three-phase alternating current motor in the embodiment of the present disclosure, and then form different loops with the power supply module, the energy storage module, and the three-phase inverter. A heat source is supplied through the three phases of coils in the three-phase alternating current motor, the three-phase inverter, the energy storage module, and an internal heating device thereof. After the heat exchange medium is heated, the component to be heated can be heated through an original cooling loop, the temperature of the component to be heated can be increased without using an engine or adding a heating device, the heating efficiency is high, and the temperature of the component to be heated is increased rapidly.

In specific embodiments, the component to be heated and the power supply module are the same component, such as a power battery. Therefore, in the process of forming a circuit loop, the temperature of the power battery is increased due to the internal resistance, and the heat generated by the motor control circuit in the present disclosure can be transferred to the power battery. That is, the motor control circuit in the present disclosure can be used not only for the power battery to supply power to the three-phase alternating current motor to drive wheels to rotate, but also for supplying a heat source to a power battery to be heated.

As a first implementation, the power battery 104, the first switch module 103, the energy storage module 105, the three-phase alternating current motor 101, and the three-phase inverter 102 form a first charging loop, and the three-phase alternating current motor 101, the three-phase inverter 102, and the energy storage module 105 form a first discharging loop. The control module 106 alternately turns on the first charging loop and the first discharging loop by controlling the three-phase inverter 102, so that the power supply module 104 charges the energy storage module 105 and the three phases of coils and discharges the energy storage module 105 and the three phases of coils alternately.

The first charging loop forms an inductive energy storage loop. The control module 106 controls the first switch module 103 to be turned on and controls the power switch unit in the three-phase inverter 102 to turn on the first charging loop for a period of time, and then the control module 106 controls the first discharging loop to be turned on. The energy storage module 105 and the three-phase alternating current motor 101 both have current output, so that the discharge loop forms a current fly-wheel loop. The control module 106 can output PWM signals to control the three-phase inverter 102 to turn on the first charging loop and the first discharging loop alternately, so that the energy storage module 105, the three-phase inverter 102, and the three-phase alternating current motor 101 are in a working state. In the present implementation, the first charging loop and the first discharging loop are turned on alternately by controlling the three-phase inverter 102, so that the energy storage module, the three-phase inverter 102, and the three-phase alternating current motor 101 can heat the cooling liquid flowing through the power battery.

Figure 12:
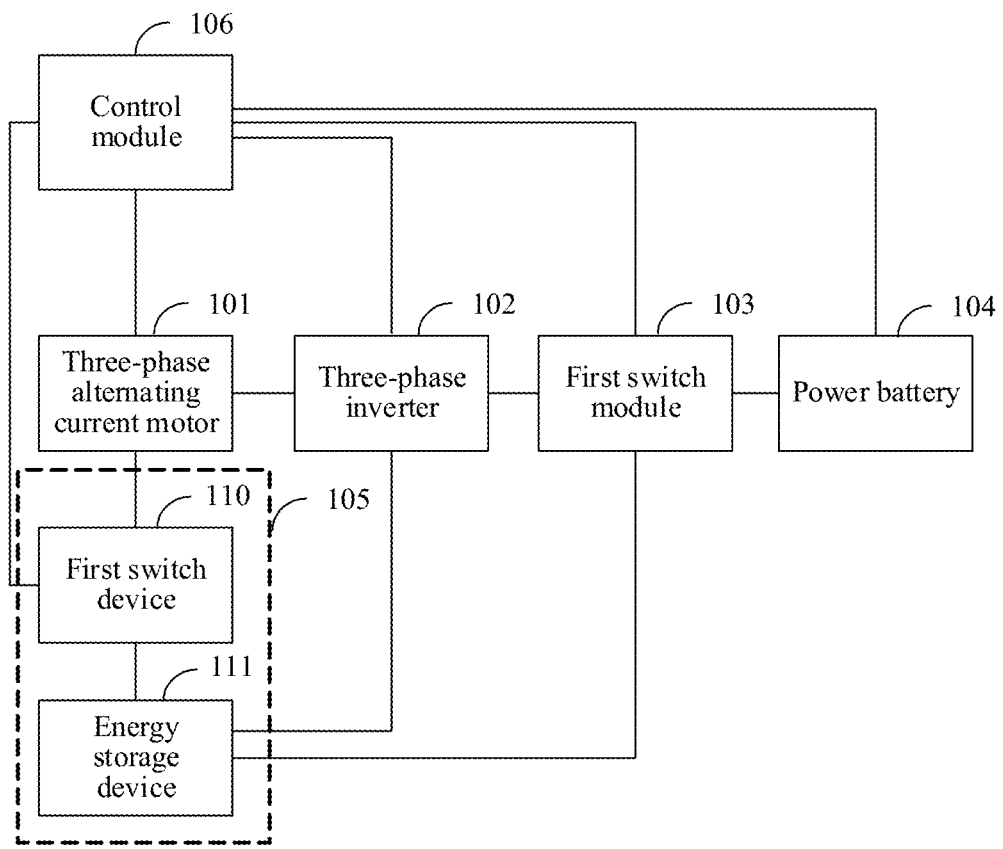
FIG. 12 is another schematic structure diagram of the temperature control device of a vehicle according to another embodiment of the present disclosure.

As an implementation, as shown in FIG. 12, both the power supply module 104 and a device to be heated are power batteries 104. Due to the inherent characteristics of the batteries, the charge-discharge capacity of the power battery 104 can be greatly reduced in a low-temperature state, which affects the use of new energy vehicles in a cold area. In order to make the power battery 104 work normally, the temperature of the power battery 104 needs to be increased when the temperature of the power battery 104 is too low. Therefore, the temperature of the power battery 104 is obtained through the control module 106, the temperature of the power battery 104 may be obtained through a battery manager, the temperature of the power battery 104 is compared with a preset temperature value to determine whether the power battery 104 is in a low-temperature state, and when it is detected that the temperature of the power battery 104 is lower than the preset temperature value, the temperature of the power battery 104 can be increased in a manner of increasing the temperature of a heat exchange medium flowing through the power battery 104. Since the energy storage module 105, the three-phase inverter 102, and the three-phase alternating current motor 101 all generate heat in the working process, the energy storage module 105, the three-phase inverter 102, and the three-phase alternating current motor 101 may be controlled to heat the heat exchange medium flowing through the power battery 104. The manner of heating the heat exchange medium may be that the power battery 104 charges the energy storage module 105 and the three phases of coils, the energy storage module 105 and the three phases of coils are discharged after electric energy is stored, and heat is generated when the energy storage module 105 and the three phases of coils are charged and discharged, which can heat cooling liquid.

The energy storage module 105 includes an energy storage device 111 and a first switch device 110. The first switch device 110 is connected to the three-phase alternating current motor 101, the control module 106, and the energy storage device 111. The energy storage device 111 is connected to the three-phase inverter 102 and the first switch module 103. The power battery 104, the first switch module 103, the energy storage device 111, the first switch device 110, the three-phase alternating current motor 101, and the three-phase inverter 102 form a first charging loop. The energy storage device 111, the first switch device 110, the three-phase alternating current motor 101, and the three-phase inverter 102 form a first discharging loop. The control module 106 controls the first switch device 110 to be turned on, and alternately turns on the first charging loop and the first discharging loop by controlling the three-phase inverter 102.

The energy storage device 111 may be an inductor, the control module 106 can control the energy storage device 111 to be connected to the first charging loop or the first discharging loop and disconnected from the first charging loop or the first discharging loop by providing the first switch device 110, and the working state of the energy storage device 111 can be controlled.

Figure 13:
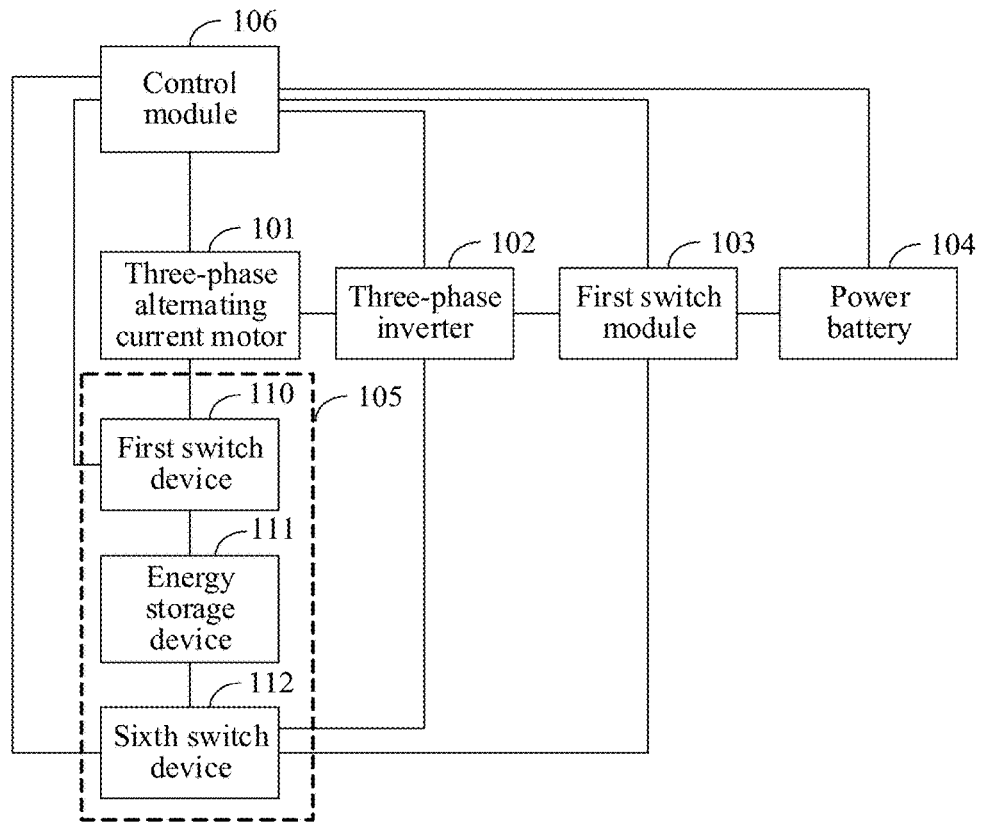
FIG. 13 is another schematic structure diagram of the temperature control device of a vehicle according to another embodiment of the present disclosure.

According to some embodiments of the present disclosure, as shown in FIG. 13, the energy storage module 105 further includes a sixth switch device 112. A control end of the sixth switch device 112 is connected to the control module 106. A connection end of the sixth switch device 112 is connected to the energy storage device 111. A first gating end of the sixth switch device 112 is connected to a first end of the three-phase inverter 102 and a first end of the first switch module 103. A second gating end of the sixth switch device 112 is connected to a second end of the three-phase inverter 102 and a second end of the first switch module 103. The control module 106 controls a connection end of the sixth switch device 112 to alternately gate and connect the first gating end and the second gating end. The control module 106 also controls the first switch device 110 to be turned on so as to control the energy storage module to be in a working state.

The sixth switch device 112 is a single-pole double-throw switch. The connection end of the sixth switch device 112 may be connected to the first gating end or the second gating end according to a signal output by the control module 106. When the single-pole double-throw switch is connected to the first gating end, the energy storage module 105 is connected to the first end of the three-phase inverter 102 and the first end of the first switch module 103. At this moment, current in the three-phase inverter 102 flows through a power switch in a lower bridge leg and a fly-wheel diode in an upper bridge leg, the current flows through only half of power devices in each turn-on power switch unit of the three-phase inverter 102, and does not flow through the remaining power devices. When the single-pole double-throw switch is connected to the second gating end, the energy storage module 105 is connected to the second end of the three-phase inverter 102 and the second end of the first switch module 103. At this moment, current in the three-phase inverter 102 flows through a power switch in the upper bridge leg and a diode in the lower bridge leg, the current flows through only half of power devices in each turn-on power switch unit of the three-phase inverter 102, and does not flow through the remaining power devices. In the present implementation, the sixth switch device is provided, when the periodic connection of an upper contact and a lower contact of the sixth switch device is controlled, the sixth switch device is connected to the first gating end in the first half period, and is connected to the second gating end in the second half period, so that the power devices in the upper bridge leg and the lower bridge leg of the three-phase inverter 102 can be energized and heated in turns, and the heating of the three-phase inverter 102 tends to be balanced in one rotation period. The motor control circuit in the present disclosure may implement two functions: the power supply can be used for the power battery to supply power to the three-phase alternating current motor to drive the wheels to rotate, and a heat source can be supplied to the power battery needing to be heated. Meanwhile, the influence on the service life of the three-phase inverter 102 is reduced.

Figure 14:
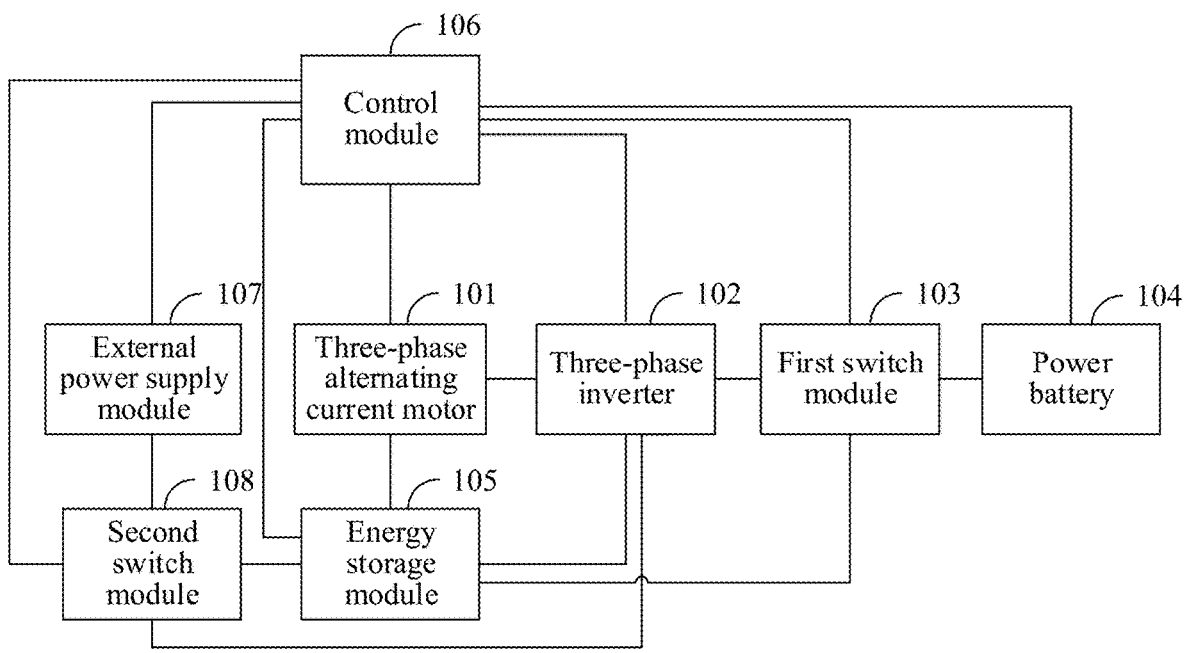
FIG. 14 is another schematic structure diagram of the temperature control device of a vehicle according to another embodiment of the present disclosure.

As a second implementation, as shown in FIG. 14, a power battery 104 heating device further includes an external power supply module 107 and a second switch module 108. The external power supply module 107 is connected to the control module 106 and the second switch module 108. The second switch module 108 is connected to the energy storage module 105, the three-phase inverter 102, and the control module 106. When obtaining that the temperature of the power battery 104 is lower than a preset temperature value and obtaining that the external power supply module 107 is connected, the control module 106 controls the first switch module 103 to be turned off and the second switch module 108 to be turned on, and enables the external power supply module 107 to charge the energy storage module 105 and the three phases of coils and discharge the energy storage module 105 and the three phases of coils alternately by controlling the three-phase inverter 102, so that the energy storage module 105, the three-phase inverter 102, and the three-phase alternating current motor 101 heat cooling liquid flowing through the power battery 104.

The control module 106 obtains whether the external power supply module 107 is connected when obtaining that the temperature of the power battery 104 is lower than a preset temperature value, charges the energy storage module 105 and the three phases of coils through the external power supply module 107 when the external power supply module 107 is connected, and discharges the energy storage module 105 and the three phases of coils after electric energy is stored. Heat is generated when the energy storage module 105 and the three phases of coils are charged and discharged, which can heat the cooling liquid. In the embodiment of the present disclosure, a neutral wire is led out of the three-phase alternating current motor. When the neutral wire is connected to the external power supply module, the neutral wire forms different loops with the external power supply module, the energy storage module, and the three-phase inverter 102. A heat source is supplied through the three phases of coils in the three-phase alternating current motor, the three-phase inverter 102, the energy storage module, and an internal heating device thereof. After the cooling liquid is heated, the power battery can be heated through an original cooling loop, the temperature of the power battery can be increased without using an engine or adding a heating device, the heating efficiency is high, and the temperature of the power battery is increased rapidly.

According to some embodiments of the present disclosure, the external power supply module 107, the second switch module 108, the energy storage module 105, the three-phase alternating current motor 101, and the three-phase inverter 102 form a second charging loop, and the three-phase alternating current motor 101, the three-phase inverter 102, and the energy storage module 105 form a second discharging loop. The control module 106 alternately turns on the second charging loop and the second discharging loop by controlling the three-phase inverter 102, so that the power battery 104 charges the energy storage module 105 and the three phases of coils and discharges the energy storage module 105 and the three phases of coils alternately.

The second charging loop forms an inductive energy storage loop. The control module 106 controls the second switch module 108 to be turned on and controls the power switch unit in the three-phase inverter 102 to turn on the second charging loop for a period of time, and then the control module 106 controls the second discharging loop to be turned on. An energy storage unit and the three-phase alternating current motor 101 both have current output, so that the discharge loop forms a current fly-wheel loop. The control module 106 can output PWM signals to control the three-phase inverter 102 to turn on the second charging loop and the second discharging loop alternately, so that the energy storage module 105, the three-phase inverter 102, and the three-phase alternating current motor 101 are in a working state. In the present implementation, the second charging loop and the second discharging loop are turned on alternately by controlling the three-phase inverter 102, so that the energy storage module 105, the three-phase inverter 102, and the three-phase alternating current motor 101 can heat the cooling liquid flowing through the power battery 104.

Figure 15:
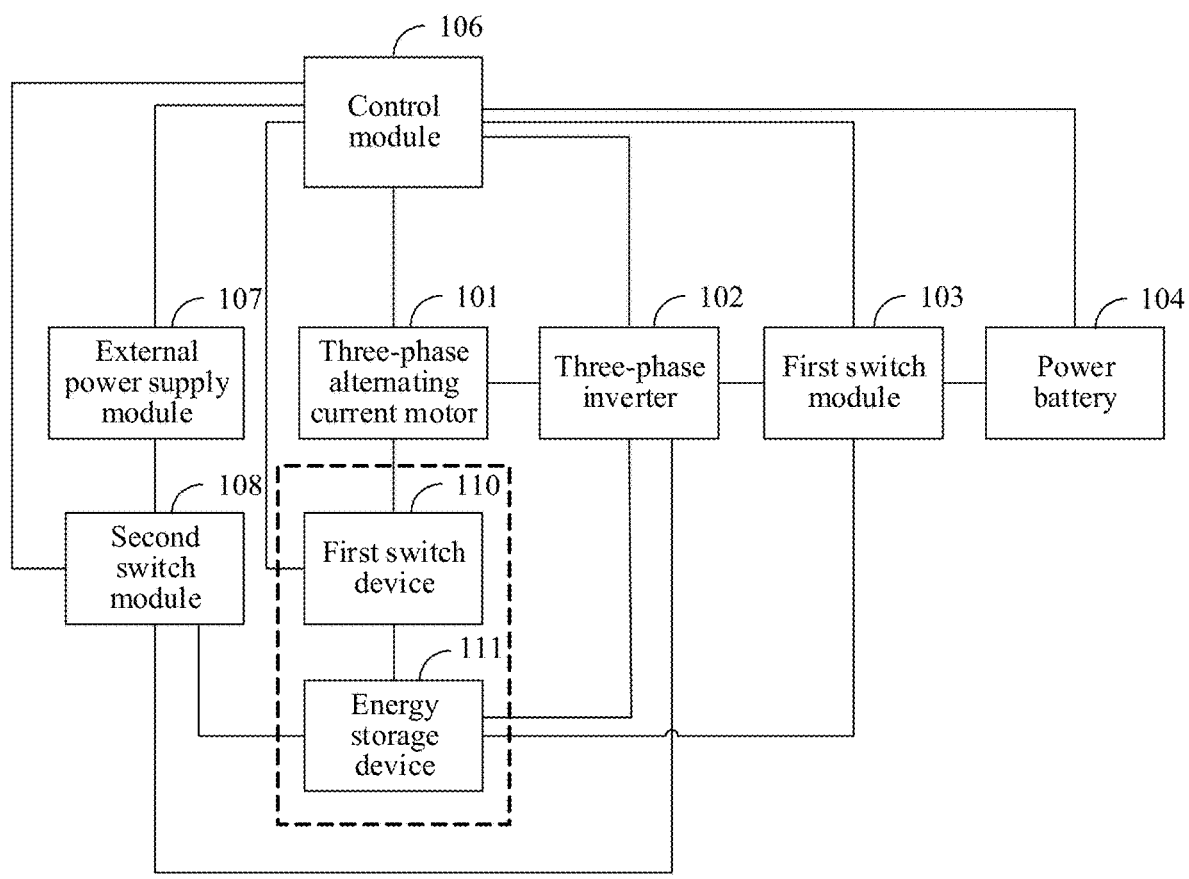
FIG. 15 is another schematic structure diagram of the temperature control device of a vehicle according to another embodiment of the present disclosure.

According to some embodiments of the present disclosure, as shown in FIG. 15, the energy storage module 105 includes an energy storage device 111 and a first switch device 110. The first switch device 110 is connected to the three-phase alternating current motor 101, the control module 106, and the energy storage device 111. The energy storage device 111 is connected to the three-phase inverter 102, the first switch module 103, and the second switch module 108. The external power supply module 107, the second switch module 108, the energy storage device 111, the first switch device 110, the three-phase alternating current motor 101, and the three-phase inverter 102 form a second charging loop. The three-phase alternating current motor 101, the three-phase inverter 102, the energy storage device 111, and the first switch device 110 form a second discharging loop. The control module 106 controls the first switch device 110 to be turned on, and alternately turns on the second charging loop and the second discharging loop by controlling the three-phase inverter 102.

Figure 16:
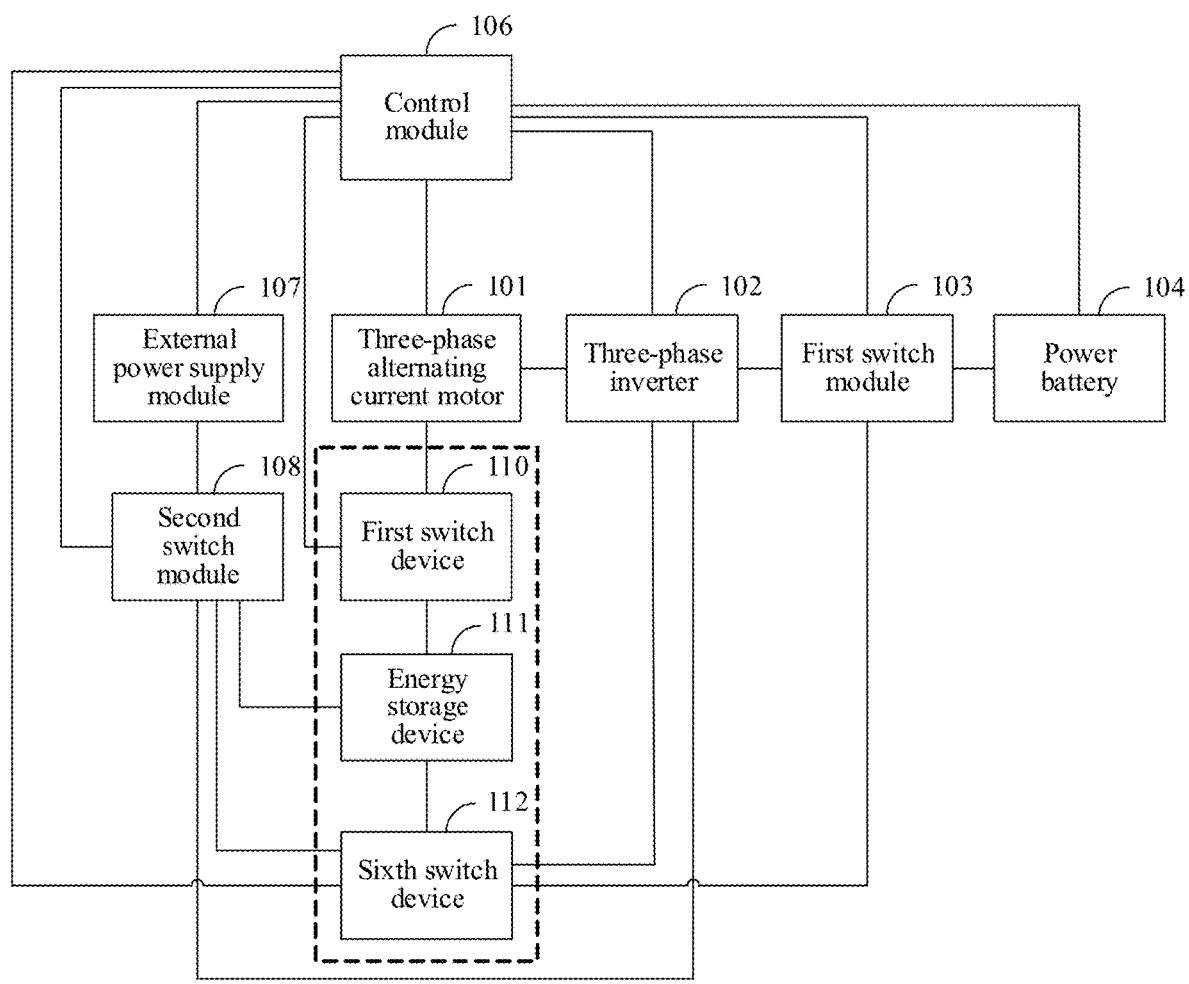
FIG. 16 is another schematic structure diagram of the temperature control device of a vehicle according to another embodiment of the present disclosure.

According to some embodiments of the present disclosure, as shown in FIG. 16, the energy storage module 105 further includes a sixth switch device 112. A control end of the sixth switch device 112 is connected to the control module 106. A connection end of the sixth switch device 112 is connected to the energy storage device 111. A first gating end of the sixth switch device 112 is connected to a first end of the three-phase inverter 102, a first end of the first switch module 103, and a first end of the second switch module 108. A second gating end of the sixth switch device 112 is connected to a second end of the three-phase inverter 102, a second end of the first switch module 103, and a second end of the second switch module 108. The control module 106 controls a connection end of the sixth switch device 112 to be connected to the first gating end or the second gating end.

In the present implementation, the sixth switch device is provided, when the periodic connection of an upper contact and a lower contact of the sixth switch device is controlled, the sixth switch device is connected to the first gating end in the first half period, and is connected to the second gating end in the second half period, so that the power devices in the upper bridge leg and the lower bridge leg of the three-phase inverter 102 can be energized and heated in turns, and the heating of the three-phase inverter 102 tends to be balanced in one rotation period.

For the three-phase inverter 102, as an implementation, the three-phase inverter 102 includes three phases of bridge legs, each phase of bridge leg includes two power switch units connected in series, and the three phases of coils of the three-phase alternating current motor 101 are connected to a connection point of the two power switch units of each phase of bridge leg respectively. The control module 106 controls the two power switch units on at least one phase of bridge leg in the three-phase inverter 102 to be turned on alternately, so that the power battery 104 or the external power supply module 107 charges the three phases of coils of the three-phase alternating current motor 101 and the energy storage module 105 and discharges the three phases of coils of the three-phase alternating current motor 101 and the energy storage module 105 alternately.

The first power switch unit and the fourth power switch unit in the three-phase inverter 102 form an A phase bridge leg, the third power switch unit and the sixth power switch unit form a B phase bridge leg, and an input end of the fifth power switch unit and the second power switch unit form a phase C bridge leg. The control mode of the three-phase inverter 102 may be any one or a combination of more of the following: controlling only any one or two of bridge legs of three phases A, B, and C and controlling the three phases of bridge legs together. There are totally 7 control modes, which can realize different heating effects, and the control modes are flexible and simple. A large heating power, a medium heating power, and a small heating power may be selected through switching of the bridge legs. Power switches of any one phase of bridge leg may be selected and controlled for small-power heating, and the three phases of bridge legs may be switched in turns. For example, the A phase bridge leg works independently to control the first power switch unit and the fourth power switch unit to perform heating for a period of time. Then, the B phase bridge leg works independently to control the third power switch unit and the sixth power switch unit to perform heating for the same period of time. Then, the C phase bridge leg works independently to control the fifth power switch unit and the second power switch unit to perform heating for the same period of time. Then, the A phase bridge leg A works again. The three-phase inverter 102 and the three phases of coils are energized and heated in turns by means of this cycle, and the three-phase heating is more balanced. Power switches of any two phases of bridge legs may be selected and controlled for medium-power heating, and the three phases of bridge legs may be switched in turns. For example, the A phase bridge leg A and the B phase bridge leg work to control the first power switch unit, the fourth power switch unit, the third power switch unit, and the sixth power switch unit to perform heating for a period of time. Then, the B phase bridge leg B and the C phase bridge leg work to control the third power switch unit, the sixth power switch unit, the sixth power switch unit, and the second power switch unit to perform heating for the same period of time. Then, the C phase bridge leg C and the A phase bridge leg work to control the fifth power switch unit, the second power switch unit, the first power switch unit, and the fourth power switch unit to perform heating for the same period of time. Then, the A phase bridge leg A and the B phase bridge leg work again. The heating of the three-phase inverter 102 and the three phases of coils is more balanced by means of this cycle. Power switches of three phases of bridge legs may be selected and controlled for large-power heating. A three-phase loop is balanced theoretically, so that the three-phase current is balanced, such that the heating of the three-phase inverter 102 and the three phases of coils is balanced, the three-phase current is basically direct current, and the average values are basically consistent. Since three-phase windings are symmetrical and three-phase composite magnetomotive forces inside the motor are basically zero, a stator magnetic field is basically zero, and the motor basically has no torque generation, which greatly reduces the stress of a transmission system.

Another embodiment of the present disclosure provides a method for heating a temperature control device 100 of a vehicle 200. The temperature control device 100 includes a power battery, a first switch module, a three-phase inverter, and a three-phase alternating current motor, which are sequentially connected. The temperature control device 100 further includes an energy storage module which is connected to the first switch module, the three-phase inverter, and a common contact of three phases of coils of the three-phase alternating current motor respectively.

The method for heating the temperature control device includes the following steps.

When it is obtained that the temperature of the power battery is lower than a preset temperature value, the first switch module is controlled to be turned on.

The three-phase inverter is controlled to enable the power battery to charge and discharge the energy storage module and the three phases of coils alternately, so that the energy storage module, the three-phase inverter, and the three-phase alternating current motor heat cooling liquid flowing through the power battery.

According to some embodiments of the present disclosure, the temperature control device further includes an external power supply module and a second switch module.

The method for heating the temperature control device further includes the following steps.

When it is obtained that the temperature of the power battery is lower than the preset temperature value and the external power supply module is connected, the first switch module is controlled to be turned off and the second switch module is controlled to be turned on.

The three-phase inverter is controlled to enable the external power supply module to charge and discharge the energy storage module and the three phases of coils alternately, so that the energy storage module, the three-phase inverter, and the three-phase alternating current motor heat cooling liquid flowing through the power battery.

The technical solution of the present disclosure is specifically described below by a specific circuit structure.

Figure 17:
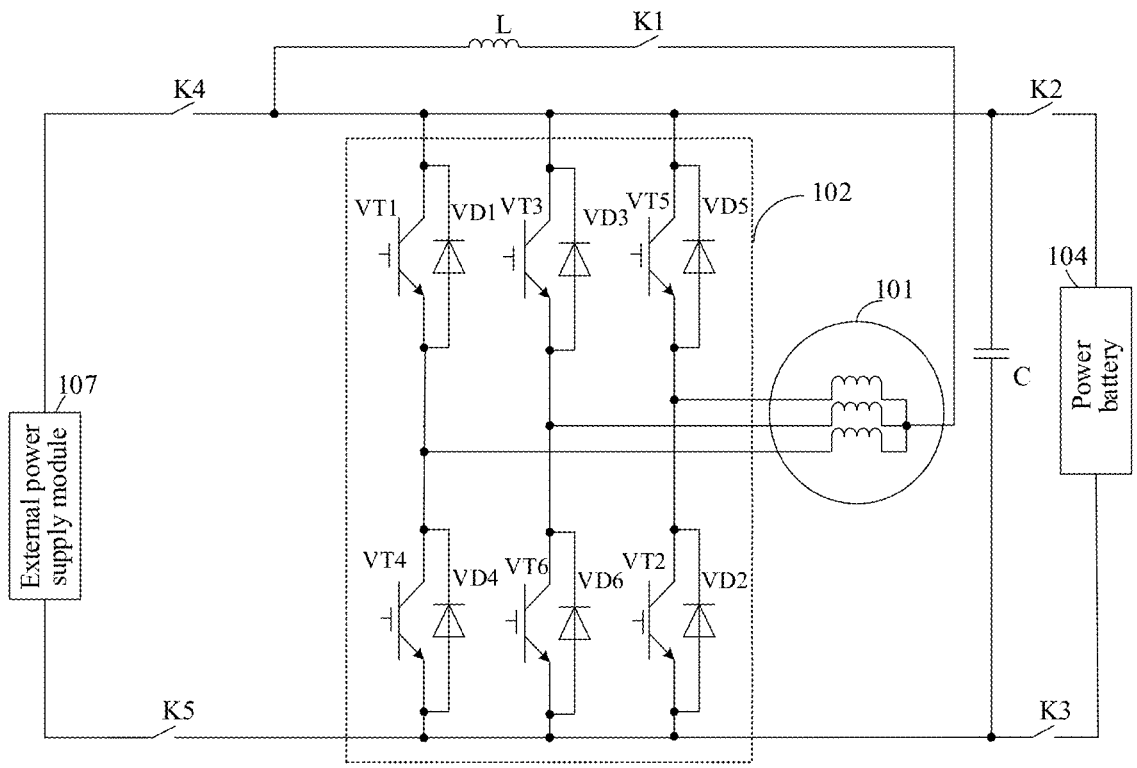
FIG. 17 is a circuit diagram of the temperature control device of a vehicle according to another embodiment of the present disclosure.

FIG. 17 is a circuit diagram of an example of a temperature control device 100 according to the present disclosure. In order to facilitate explanation of the temperature control device 100, other electrical equipment is omitted from the above diagram, and only the power battery 104, the three-phase inverter 102, and the three-phase alternating current motor 101 are considered. The first switch module 103 includes a switch K2 and a switch K3, the second switch module 108 includes a switch K4 and a switch K5, and the energy storage module 105 includes an inductor L and a switch K1. The power battery 104 is connected to a bus capacitor C in parallel. The first power switch unit in the three-phase inverter 102 includes a first upper bridge leg VT1 and a first upper bridge diode VD1. The second power switch unit includes a second lower bridge leg VT2 and a second lower bridge diode VD2. The third power switch unit includes a third upper bridge leg VT3 and a third upper bridge diode VD3. The fourth power switch unit includes a fourth lower bridge leg VT4 and a fourth lower bridge diode VD4. The fifth power switch unit includes a fifth upper bridge leg VT5 and a fifth upper bridge diode VD5. The sixth power switch unit includes a sixth lower bridge leg VT6 and a sixth lower bridge diode VD6. The three-phase alternating current motor 101 is a three-phase four-wire system and may be a permanent magnet synchronous motor or asynchronous motor, a neutral wire is led out from a connection midpoint of three phases of coils, the neutral wire is connected to the switch K1, and the three phases of coils of the motor are connected to upper and lower bridge legs A, B, and C in the three-phase inverter 102 respectively. The control steps of the control module 106 specifically include the following.

In step 1, when a vehicle is powered on, a vehicle controller receives a state signal of a three-phase alternating current motor (e.g., the state signal may be determined through gear information and a vehicle speed signal), and a power battery temperature signal sent from a battery manager.

In step 2, the vehicle controller detects that the current state signal of the three-phase alternating current motor is in a non-driving state (e.g., the state signal may be determined by whether the vehicle is at a P gear and whether the vehicle speed is zero).

In step 3, if no, the process exits a motor heating program.

In step 4, if the current state signal of the three-phase alternating current motor is in a non-driving state, then it is determined whether the temperature of a power battery 104 is lower than a set threshold.

In step 5, if no, the process exits a motor heating program.

In step 6, if yes, the vehicle controller sends a battery heating instruction and a heating power to the battery manager and a motor controller.

Figure 18:
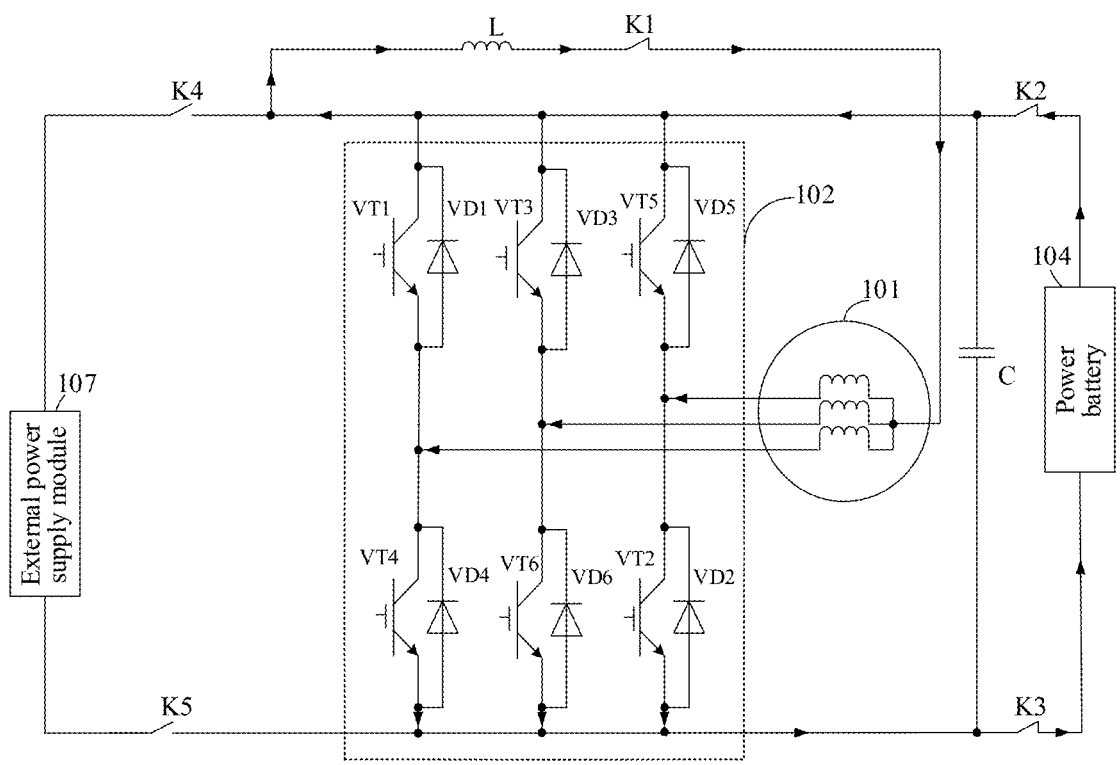
FIG. 18 is a current path diagram of the temperature control device of a vehicle according to another embodiment of the present disclosure.

In step 7, as shown in FIG. 18, the battery manager controls switches K1, K2, and K3 to be turned on so as to discharge the power battery 104 for heating. Firstly, the motor controller sends PWM control signals to the three-phase inverter 102, and the motor controller controls an upper bridge power switch of the three-phase inverter 102 to be turned off and controls a lower bridge power switch to be turned on within a turn-on time period in each PWM control signal period. The power battery 104, an inductor L, the switch K1, the three-phase alternating current motor 101, the lower bridge power switch (the second lower bridge leg VT2, the fourth lower bridge leg VT4, and the sixth lower bridge leg VT6), and the switch K3 form a first charging loop. The power battery 104 stores energy for three phases of coils of the motor and the inductor L.

Figure 19:
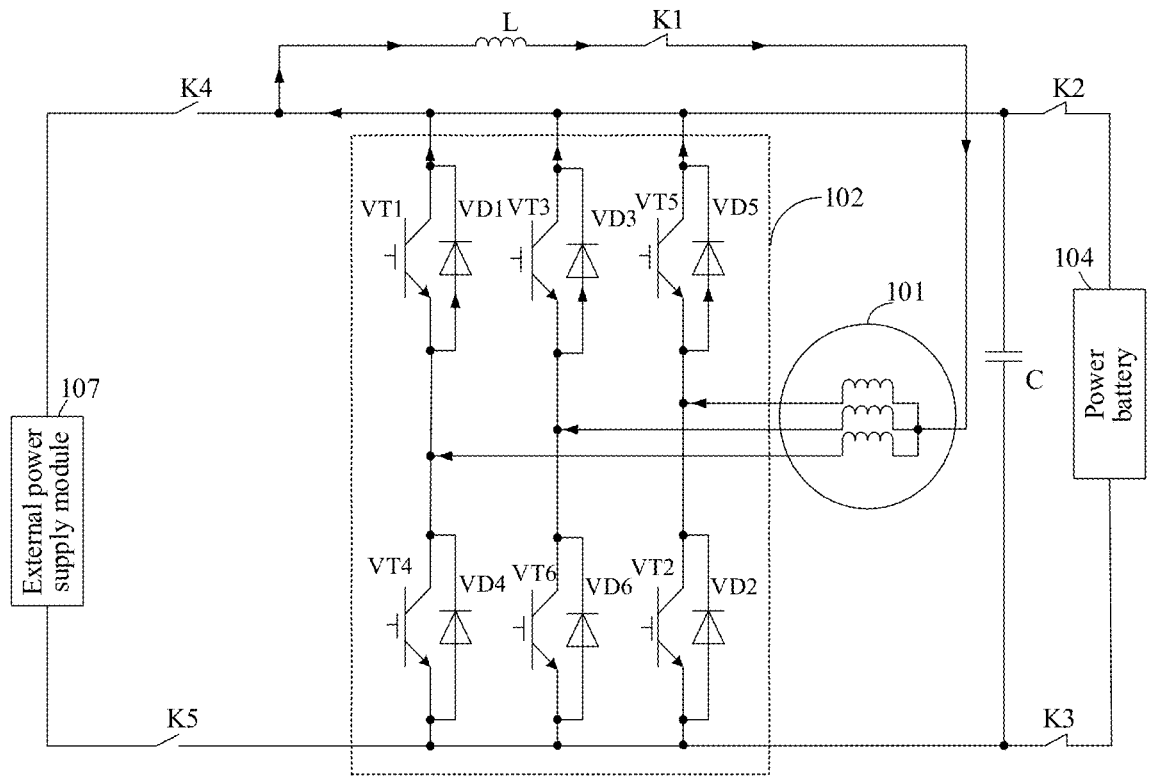
FIG. 19 is another current path diagram of the temperature control device of a vehicle according to another embodiment of the present disclosure.

In step 8, as shown in FIG. 19, the motor controller controls the lower bridge power switch of the three-phase inverter 102 to be turned off during the PWM cycle turn-off period, and the upper bridge power switch may be turned off all the time (or may be turned on at this moment). At this moment, a discharging passage of the power battery 104 is turned off, the three phases of coils of the motor, the upper bridge power switch (the first upper bridge diode VD1, the third upper bridge diode VD3, and the fifth upper bridge diode VD5), the inductor L, and the switch K1 form a discharging loop, and the three phases of coils of the motor and the inductor L are discharged and form an inductive current fly-wheel loop with the upper bridge fly-wheel diode.

In step 9, the motor controller receives battery voltage and current data, calculates an output power, regards the output power as a battery heating power, and compares the calculated heating power with a heating instruction power sent by the battery manager. If the calculated heating power is low, a PWM duty ratio and a battery output current are increased. If the calculated heating power is high, the PWM duty ratio and the battery output current are reduced until the heating power is approximated to the heating instruction power.

In step 10, the vehicle controller cyclically obtains gears, vehicle speeds, and the temperature of the power battery 104, the steps are repeated if the conditions are satisfied, the process exits the heating program if the conditions are not satisfied, the motor controller controls upper and lower bridges of the three-phase inverter 102 to be turned off, the battery manager controls the switch K1 to be turned off, and K4 and K5 may also be controlled to be turned off if charging is not required.

When the circuit is connected to the external power supply module 107, the control module 106 controls the external power supply module 107 to charge. The control steps of the control module 106 specifically include the following.

In step 1, when a vehicle is powered on, a vehicle controller receives a state signal of a three-phase alternating current motor (e.g., the state signal may be determined through gear information and a vehicle speed signal), and a power battery temperature signal sent from a battery manager.

In step 2, the vehicle controller detects that the current state signal of the three-phase alternating current motor is in a non-driving state (e.g., the state signal may be determined by whether the vehicle is at a P gear and whether the vehicle speed is zero).

In step 3, if no, the process exits a motor heating program.

In step 4, if yes, it is determined whether the temperature of a power battery is lower than a set threshold.

In step 5, if no, the process exits a motor heating program.

In step 6, if yes, the vehicle controller sends a battery heating instruction and a heating power to the battery manager and a motor controller.

Figure 20:
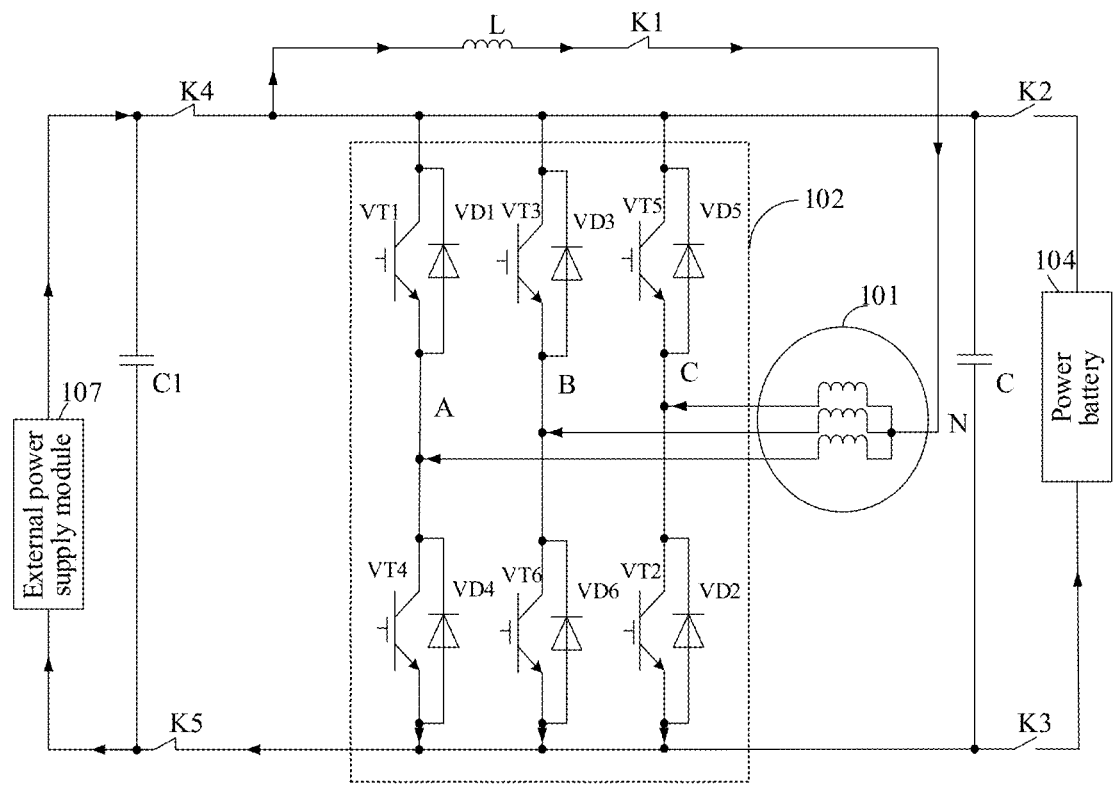
FIG. 20 is another current path diagram of the temperature control device of a vehicle according to another embodiment of the present disclosure.

In step 7, as shown in FIG. 20, the battery manager controls switches K1, K4, and K5 to be turned on so as to discharge the power battery 104 for heating. The motor controller sends PWM control signals to a three-phase inverter 102, and the motor controller controls an upper bridge power switch of the three-phase inverter 102 to be turned off and controls a lower bridge power switch to be turned on within a turn-on time period in each PWM control signal period. The external power supply module 107, an inductor L, the switch K1, the three-phase alternating current motor 101, and the lower bridge power switch (the second lower bridge leg VT2, the fourth lower bridge leg VT4, and the sixth lower bridge leg VT6) form a second charging loop. The external power supply module 107 stores energy for three phases of coils of the motor and the inductor L.

In step 8, as shown in FIG. 19, the motor controller controls the lower bridge power switch of the three-phase inverter 102 to be turned off during the PWM cycle turn-off period, and the upper bridge power switch may be turned off all the time (or may be turned on at this moment). At this moment, a discharging passage of the power battery 104 is turned off, the three phases of coils of the motor, the upper bridge power switch (the first upper bridge diode VD1, the third upper bridge diode VD3, and the fifth upper bridge diode VD5), the inductor L, and the switch K1 form a discharging loop, and the three phases of coils of the motor and the inductor L are discharged and form an inductive current fly-wheel loop with the upper bridge fly-wheel diode.

In step 9, the motor controller receives battery voltage and current data, calculates an output power, regards the output power as a battery heating power, and compares the calculated heating power with a heating instruction power sent by the battery manager. If the calculated heating power is low, a PWM duty ratio and a battery output current are increased. If the calculated heating power is high, the PWM duty ratio and the battery output current are reduced until the heating power is approximated to the heating instruction power.

In step 10, the vehicle controller cyclically detects a state signal of the three-phase alternating current motor (e.g., the state signal may be determined through gear information and a vehicle speed signal), and a power battery temperature, the steps are repeated if the conditions are satisfied, the process exits the heating program if the conditions are not satisfied, the motor controller controls upper and lower bridges of the three-phase inverter 102 to be turned off, the battery manager controls the switch K1 to be turned off, and K4 and K5 may be controlled to be turned off if charging is not required.

Figure 21:
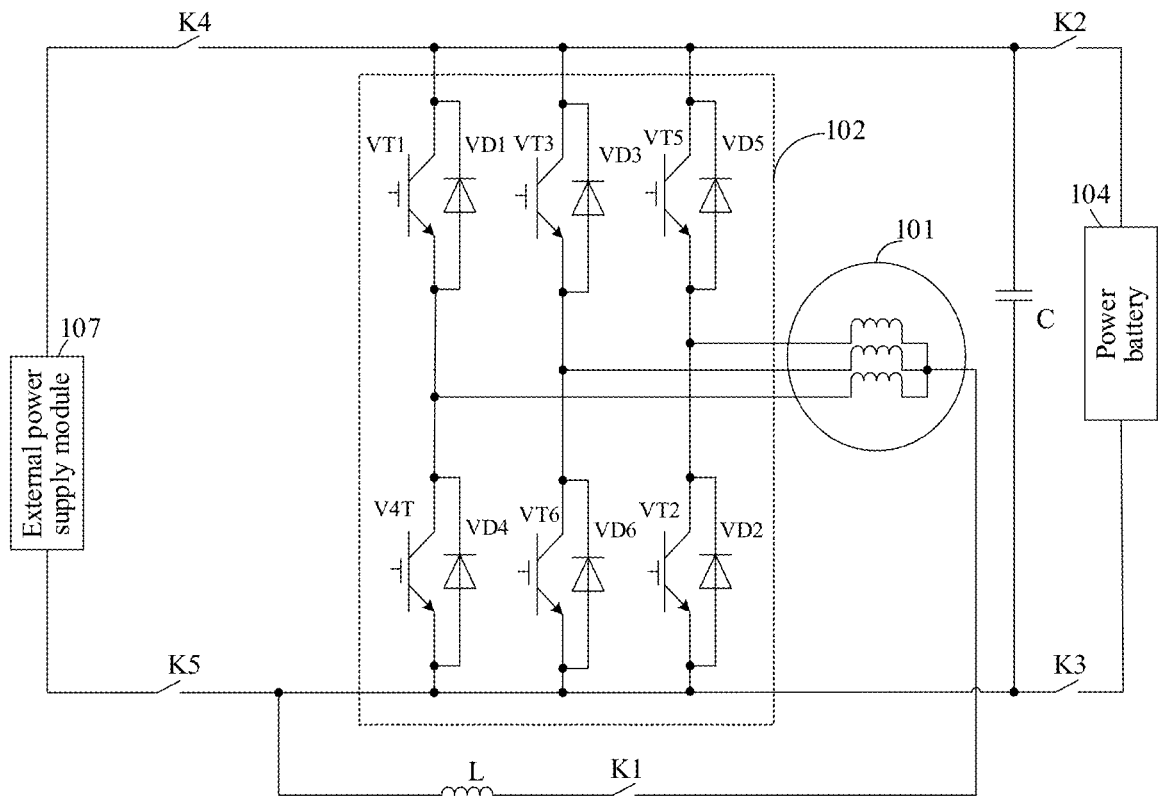
FIG. 21 is another circuit diagram of the temperature control device of a vehicle according to another embodiment of the present disclosure.

FIG. 21 is a circuit diagram of another example of a temperature control device 100 according to the present disclosure. One end of the inductor L1 is connected to a negative electrode of the three-phase inverter 102. All the above-mentioned heating functions may also be realized. For the control of the circuit topology, it should be noted that: first, according to whether the power battery is discharged for heating or the external power supply module is powered for heating, the control of switches K1, K2, K3, K4, and K5 is the same as that of the connection of the inductor L to a positive electrode of the power battery in the above circuits; and second, the difference is that the control of the power switch of the three-phase inverter 102 is just opposite to that of the connection of the inductor L to a positive electrode of the power battery in the above circuits. When the inductor L is connected to the positive electrode of the power battery, the lower bridge power switch is controlled to be turned on by PWM, and the upper bridge power switch may be turned off all the time. When the inductor L is connected to the negative electrode of the power battery, the upper bridge power switch is controlled to be turned on by PWM, and the lower bridge power switch may be turned off all the time. That is, the motor controller controls the upper bridge power switch of the three-phase inverter 102 to be turned on during the PWM cycle turn-on period, and the lower bridge power switch is turned off. The motor controller controls the upper bridge power switch of the three-phase inverter 102 to be turned off during the PWM cycle turn-off period, and the lower bridge power switch may be turned on all the time (or may be turned on at this moment). In addition, other functions such as the selection of 7 control heating modes of any one or two of bridge legs of the three phases A, B, and C, and three bridge legs, and current control modes such as phase error 60° or 180°, or two/three-phase synchronous control, or two/three-phase independent control are the same as when the connection circuit is connected to a positive electrode of a bus bar. In this way, a battery heating function with the same effect may be realized.

Figure 22:
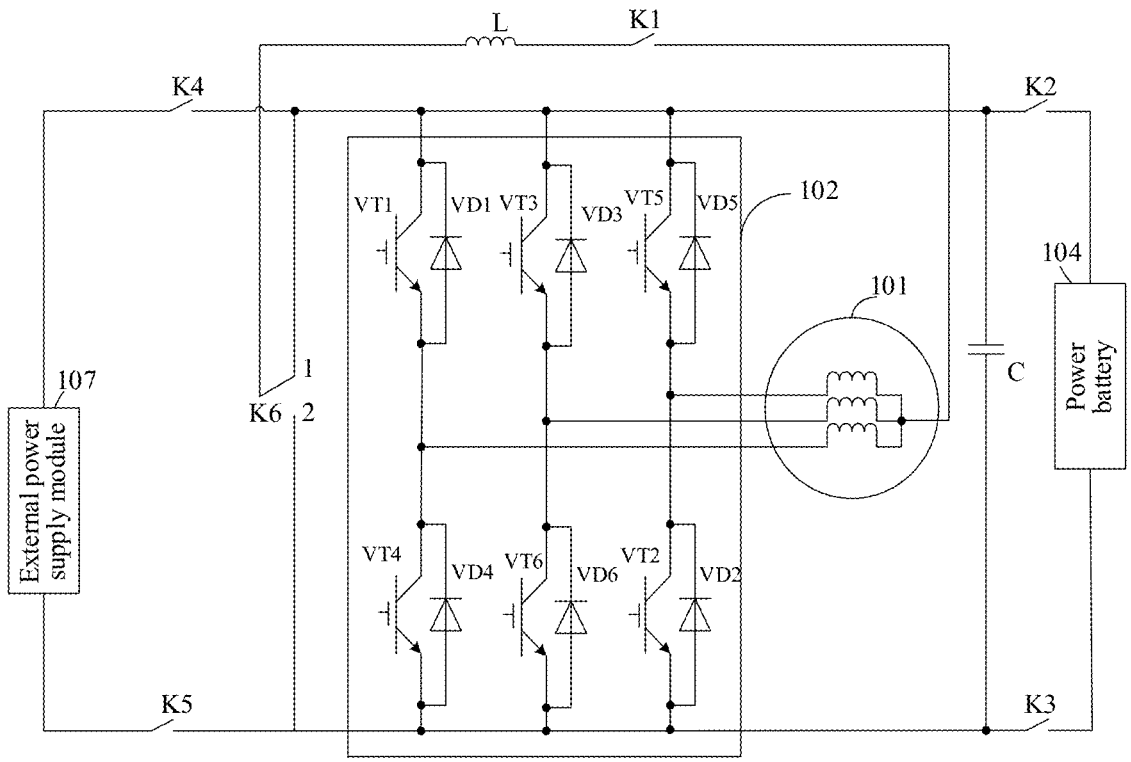
FIG. 22 is another circuit diagram of the temperature control device of a vehicle according to another embodiment of the present disclosure.

FIG. 22 is a circuit diagram of another example of a temperature control device 100 according to the present disclosure. One end of the inductor L1 may be connected to a positive or negative electrode of the three-phase inverter 102 through a single-pole double-throw switch K6, and all of the above-mentioned heating functions may be realized. When the single-pole double-throw switch is connected to a contact 1, one end of the inductor L1 is connected to the positive electrode of the three-phase inverter 102. At this moment, all heating control methods are controlled in the above manner of connecting the connection circuit to the positive electrode of the bus bar. When the single-pole double-throw switch is connected to a contact 2, one end of the inductor L1 is connected to the negative electrode of the three-phase inverter 102. At this moment, all heating control methods are controlled in the above manner of connecting the connection circuit to the negative electrode of the bus bar. When the connection circuit is connected to the positive electrode of the bus bar, for the three-phase inverter 102, current only flows through the lower bridge power switch and the upper bridge diode, and the current flows through only half of power devices in the three-phase inverter 102, and does not flow through the remaining power devices. When the connection circuit is connected to the negative electrode of the bus bar, for the three-phase inverter 102, current only flows through the upper bridge power switch and the lower bridge diode, and the current flows through only half of power devices in the three-phase inverter 102, and does not flow through the remaining power devices. If the periodic connection of an upper contact and a lower contact of the single-pole double-throw switch is controlled, the contact 1 is connected in the first half period, and the contact 2 is connected in the second half period, so that the power devices in the upper bridge leg and the lower bridge leg of the three-phase inverter 102 can be energized and heated in turns, and the heating of the inverter tends to be balanced in one rotation period.

Another embodiment of the present disclosure provides a vehicle 200. The vehicle 200 further includes the temperature control device 100 provided in the above embodiments.

Figure 23:
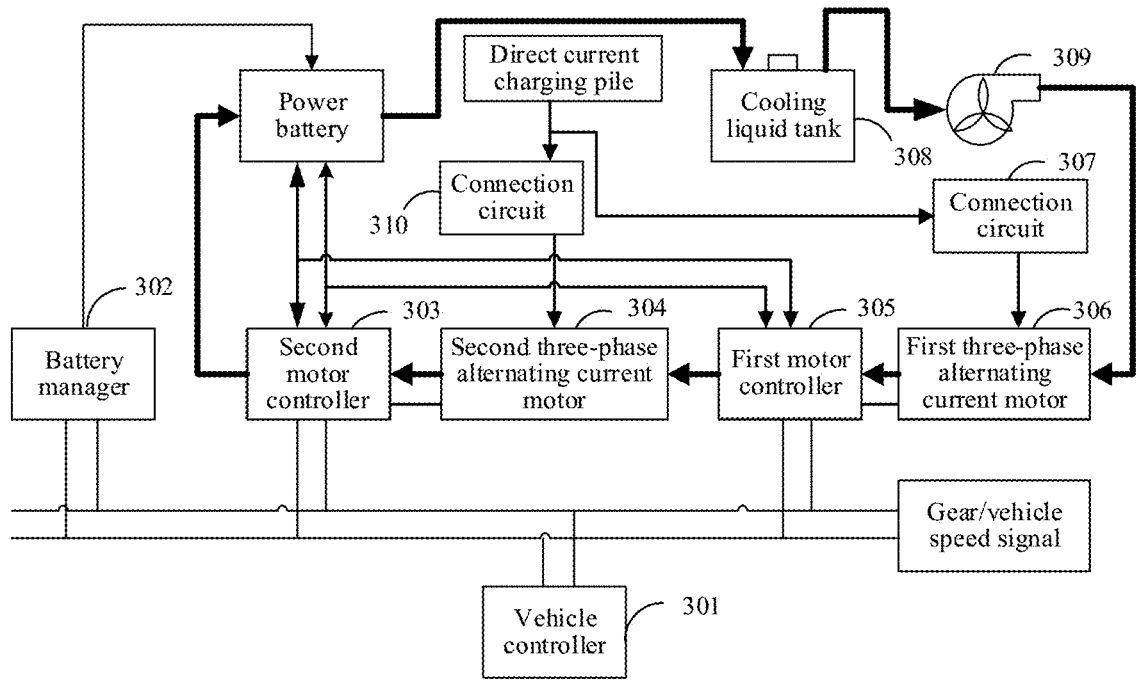
FIG. 23 is a structural schematic diagram of a vehicle according to an embodiment of the present disclosure.

As shown in FIG. 23, the control module includes a vehicle controller 301, a battery manager 302, a first motor controller 305, and a second motor controller 303. The vehicle controller 301 is connected to the battery manager 302, the first motor controller 305, and the second motor controller 303 through a CAN bus. A direct current charging pile is electrically connected to a first three-phase alternating current motor 306 through a connection line 307. The direct current charging pile is electrically connected to a second three-phase alternating current motor 304 through a connection line 310. A power battery is electrically connected to the first motor controller 305 and the second motor controller 303 separately. A cooling liquid tank 308, a water pump 309, the first three-phase alternating current motor 306, the first motor controller 305, the second three-phase alternating current motor 304, the second motor controller, and the power battery form a cooling liquid pipeline. The battery manager 302 is used to collect power battery information including voltage, current, temperature, etc. The motor controller is used to control upper and lower bridge power switches of the three-phase inverter and collect a three-phase current. The vehicle controller is used to manage the operation of a vehicle and other controller equipment on the vehicle. The battery manager 302 and the motor controller communicate with the vehicle controller 301 through a CAN wire. When detecting that the power battery needs to be heated, the vehicle controller 301 controls the water pump 309 to pump cooling liquid out of the cooling liquid tank 308, the cooling liquid sequentially flows through the power battery 104 via the first three-phase alternating current motor 306, the first motor controller 305, the second three-phase alternating current motor 304, and the second motor controller 303. The vehicle controller 301 controls the first three-phase alternating current motor 306, the first motor controller 305, the second three-phase alternating current motor 304, and the second motor controller 303 to work to heat the cooling liquid, thereby increasing the temperature of the power battery when the cooling liquid flows through the power battery.

Figure 24:
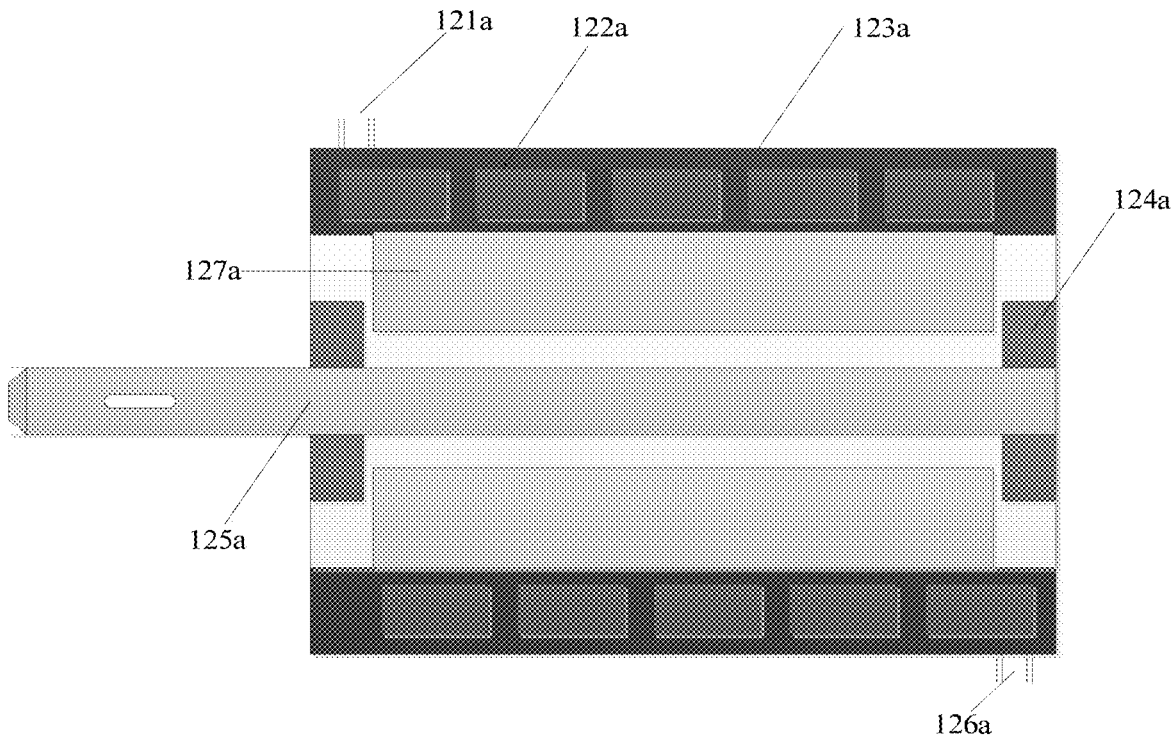
FIG. 24 is a schematic diagram of an internal structure of a three-phase alternating current motor in the vehicle according to another embodiment of the present disclosure.
Figure 25:
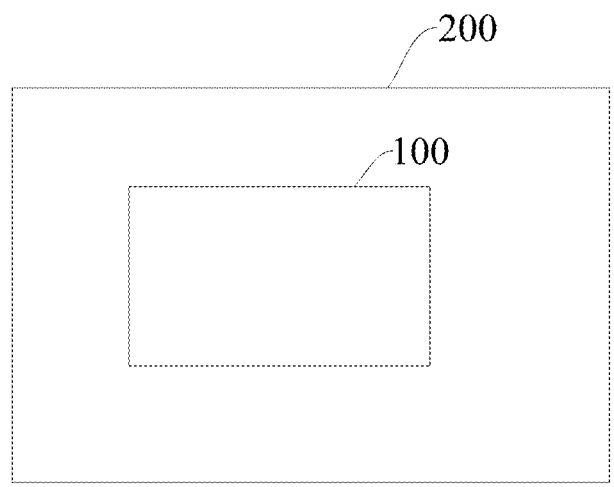
FIG. 25 is a structural schematic diagram of a vehicle according to an embodiment of the present disclosure.

According to some embodiments of the present disclosure, as shown in FIG. 24, the three-phase alternating current motor 101 includes a motor shaft 125a, a stator assembly 127a, and a motor housing 123a. The stator assembly 127a and a bearing block 124a are connected to the motor shaft 125a. The stator assembly 127a is provided in the motor housing 123a. The motor housing 123a is provided with a heat exchange medium inlet 121a and a heat exchange medium outlet 126a allowing the inflow and outflow of a heat exchange medium 122a. A heat exchange medium passage is provided between the motor housing 123a and the stator assembly 127a. The heat exchange medium passage is connected to the heat exchange medium inlet 121a and the heat exchange medium outlet 126a.

A heat exchange medium passage may be provided between the motor housing 123a and the stator assembly 127a in such a way that the heat exchange medium passage spirally surrounding the stator assembly 127a is provided in the motor housing 123a.

According to the three-phase alternating current motor 101 in the present solution, a heat exchange medium passage is provided between the motor housing 123a and the stator assembly 127a, and the heat exchange medium passage is connected to the heat exchange medium inlet 121a and the heat exchange medium outlet 126a, so that the heat exchange medium in the heat exchange medium passage can effectively absorb heat generated by the motor. In the present solution, there is no need to provide a passage in the motor shaft 125a or the stator assembly 127a, so that the influence on the structure of the motor is small, the implementation mode is simple, and the cost is low.

The power supply module charges and discharges the three phases of coils alternately by controlling the three-phase inverter, so that the three-phase inverter and the three-phase alternating current motor heat a heat exchange medium flowing through at least one of the three-phase inverter or the three-phase alternating current motor via the electrically driven cooling loop, the heat exchange medium flows into the heat exchange medium inlet of the three-phase alternating current motor, and a heat exchange medium in a heat exchange medium pipeline is heated by the stator assembly. Furthermore, when the heated heat exchange medium flows through the component to be heated via the battery cooling loop, the temperature of the component to be heated is increased.

The present disclosure provides a vehicle 200. A neutral wire is led out of the three-phase alternating current motor, and then forms different loops with the power battery, a boost module, and the three-phase inverter. A heat source is supplied through the three phases of coils in the three-phase alternating current motor, the three-phase inverter, the boost module, and an internal heating device thereof. After the cooling liquid is heated, the power battery can be heated by an original cooling loop, the temperature of the power battery can be increased without using an engine or adding a heating device, the heating efficiency is high, and the temperature of the power battery is increased rapidly.

The foregoing embodiments are merely intended for describing the technical solutions of the present disclosure, but not for limiting the present disclosure. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure, and shall fall within the protection scope of the present disclosure.

What is claimed is:

1. A temperature control device of a vehicle, comprising: a motor control circuit and a heat exchange medium circulation loop, wherein the motor control circuit comprises a switch module, a three-phase inverter, a three-phase alternating current motor, and a control module, the switch module of the motor control circuit is connected to a power supply module, three phases of coils of the three-phase alternating current motor are connected to three phases of bridge legs of the three-phase inverter, a common contact of the three phases of coils of the three-phase alternating current motor is connected to the switch module, and the control module is connected to the power supply module, the switch module, the three-phase inverter, and the three-phase alternating current motor;

the heat exchange medium circulation loop comprises an electrically driven cooling loop and a cooling loop, the control module is electrically connected to a first valve in the heat exchange medium circulation loop, at least one of the three-phase inverter or the three-phase alternating current motor and the first valve form the electrically driven cooling loop through a heat exchange medium pipeline, and the first valve and a component of the vehicle to be heated form the cooling loop through a heat exchange medium pipeline; and when the component of the vehicle to be heated needs to be heated, the control module controls the switch module to be turned on, controls the first valve to turn on the electrically driven cooling loop and the cooling loop, and enables the power supply module to charge and discharge the three phases of coils alternately by controlling the three-phase inverter, so that the three-phase inverter and the three-phase alternating current motor heat a heat exchange medium flowing through at least one of the three-phase inverter or the three-phase alternating current motor, using heat generated by at least the three-phase inverter or the three-phase alternating current motor.

2. The temperature control device according to claim 1, wherein the component to be heated is a power battery, the first valve and the power battery form a battery cooling loop through a heat exchange medium pipeline, and the control module controls the first valve to turn on the electrically driven cooling loop and the battery cooling loop when obtaining that the temperature of the power battery is lower than a first preset temperature or receiving a valve turn-on instruction.

3. The temperature control device according to claim 2, wherein after controlling the first valve to turn on the electrically driven cooling loop and the battery cooling loop, the control module controls the three-phase inverter and the three-phase alternating current motor to stop heating when obtaining that the temperature of the power battery reaches a second preset temperature, the second preset temperature being greater than the first preset temperature.

4. The temperature control device according to claim 3, wherein the control module controls the first valve to turn off a passage between the electrically driven cooling loop and the battery cooling loop when obtaining that the temperature of the power battery reaches a third preset temperature, the third preset temperature being greater than the second preset temperature.

5. The temperature control device according to claim 2, wherein the heat exchange medium circulation loop further comprises a second valve, a third valve, and a first radiator, the second valve and the third valve are both electrically connected to the control module, the second valve and the third valve are located in the electrically driven cooling loop, and the second valve, the third valve, and the first radiator form a cooling heat dissipation loop; and the control module controls the first valve, the second valve, and the third valve to turn on the electrically driven cooling loop, the battery cooling loop, and the cooling heat dissipation loop when obtaining that the temperature of the power battery is higher than a fourth preset temperature, so that the first radiator cools the heat exchange medium flowing through the cooling heat dissipation loop, and when the cooled heat exchange medium flows through the power battery, the temperature of the power battery is reduced, the fourth preset temperature being greater than the first preset temperature.

6. The temperature control device according to claim 2, wherein the heat exchange medium circulation loop further comprises a fourth valve and an engine, the fourth valve is electrically connected to the control module, the fourth valve is located in the battery cooling loop, and the fourth valve and the engine form an engine cooling loop through a heat exchange medium pipeline; and the control module controls the fourth valve to turn on the battery cooling loop and the engine cooling loop when obtaining that the temperature of the engine is lower than a fifth preset temperature, so that the engine and the power battery exchange heat by a heat exchange medium flowing through the battery cooling loop and the engine cooling loop.

7. The temperature control device according to claim 2, wherein the heat exchange medium circulation loop further comprises a fifth valve and a heat pump air conditioner assembly, the fifth valve is electrically connected to the control module, the fifth valve is located in the battery cooling loop, and the fifth valve and the heat pump air conditioner assembly form an air-conditioning heating loop through a heat exchange medium pipeline;

the control module controls the fifth valve to communicate the air-conditioning heating loop and the battery cooling loop when receiving an air-conditioning heating instruction, so that the heat pump air conditioner assembly and the power battery exchange heat by a heat exchange medium flowing through the air-conditioning heating loop and the battery cooling loop; or the heat exchange medium circulation loop further comprises a heat exchanger and an air conditioner assembly, the heat exchanger is located in the battery cooling loop, and the heat exchanger and the air conditioner assembly form an air-conditioning cooling loop through a heat exchange medium pipeline; and a heat exchange medium in the battery cooling loop and a heat exchange medium in the air-conditioning cooling loop exchange heat by the heat exchanger, so that the air-conditioner assembly and the power battery exchange heat by the heat exchanger.

8. A temperature control device of a vehicle, comprising: a motor control circuit and a heat exchange medium circulation loop, wherein the motor control circuit comprises a switch module, a three-phase inverter, a three-phase alternating current motor, and a control module, the switch module of the motor control circuit is connected to a power supply module, three phases of coils of the three-phase alternating current motor are connected to three phases of bridge legs of the three-phase inverter, a common contact of the three phases of coils of the three-phase alternating current motor is connected to the switch module, and the control module is connected to the power supply module, the switch module, the three-phase inverter, and the three-phase alternating current motor;

the heat exchange medium circulation loop comprises an electrically driven cooling loop and a cooling loop, the control module is electrically connected to a first valve in the heat exchange medium circulation loop, at least one of the three-phase inverter or the three-phase alternating current motor and the first valve form the electrically driven cooling loop through a heat exchange medium pipeline, and the first valve and a component to be heated form the cooling loop through a heat exchange medium pipeline; and when obtaining that the component to be heated needs to be heated, the control module controls the switch module to be turned on, controls the first valve to turn on the electrically driven cooling loop and the cooling loop, and enables the power supply module to charge and discharge the three phases of coils alternately by controlling the three-phase inverter, so that the three-phase inverter and the three-phase alternating current motor heat a heat exchange medium flowing through at least one of the three-phase inverter or the three-phase alternating current motor, wherein the motor control circuit further comprises an energy storage module, the energy storage module is connected to a connection point of the three phases of coils of the three-phase alternating current motor, and the energy storage module is further connected to the switch module; and when obtaining that the component to be heated needs to be heated, the control module controls the switch module to be turned on, controls the first valve to turn on the electrically driven cooling loop and the cooling loop, and enables the power supply module to charge and discharge the energy storage module and the three phases of coils alternately by controlling the three-phase inverter, so that the three-phase inverter and the three-phase alternating current motor heat a heat exchange medium flowing through at least one of the three-phase inverter and the three-phase alternating current motor via the electrically driven cooling loop.

9. The temperature control device according to claim 8, wherein the switch module, the energy storage module, the three-phase alternating current motor, and the three-phase inverter form a first charging loop, and the three-phase alternating current motor, the three-phase inverter, and the energy storage module form a first discharging loop; and the control module controls the three-phase inverter to turn on the first charging loop and the first discharging loop alternately, so that the power battery charges and discharges the energy storage module and the three phases of coils alternately.

10. The temperature control device according to claim 9, wherein the power supply module is a power battery, and the switch module is a first switch module; or the power supply module is an external power supply module, and the switch module is a second switch module.

11. The temperature control device according to claim 10, wherein the energy storage module comprises an energy storage device and a first switch device which are connected in series, a first end of the energy storage module is connected to a first end of the three-phase inverter, or a first end of the energy storage module is connected to a second end of the three-phase inverter, and the control module controls the first switch device to be turned on so as to control the energy storage module to be in a working state; or the energy storage module comprises an energy storage device, a first switch device, and a sixth switch device, a connection end of the sixth switch device is connected to the energy storage device and the first switch device in series, a first gating end of the sixth switch device is connected to a first end of the three-phase inverter, a second gating end of the sixth switch device is connected to a second end of the three-phase inverter, the control module controls the connection end of the sixth switch device to be connected to the first gating end or the second gating end, and the control module also controls the first switch device to be turned on so as to control the energy storage module to be in a working state.

12. The temperature control device according to claim 8, wherein the three-phase inverter comprises three phases of bridge legs, each phase of bridge leg comprises two power switch units connected in series, the three phases of coils of the three-phase alternating current motor are connected to a connection point of the two power switch units of each phase of bridge leg respectively, and the control module obtains the number of turn-on bridge legs of the three-phase inverter according to a power to be heated, and controls a corresponding number of bridge legs to work according to the number of turn-on bridge legs.

13. The temperature control device according to claim 12, wherein when obtaining that the power to be heated of the power battery is smaller than a first preset power, the control module determines that the number of turn-on bridge legs of the three-phase inverter is 1, and controls any one of the three phases of bridge legs to work or the three phases of bridge legs to work alternately.

14. The temperature control device according to claim 13, wherein when obtaining that the power to be heated of the power battery is not smaller than a first preset power and is smaller than a second preset power, the control module determines that the number of turn-on bridge legs of the three-phase inverter is 2, and controls any two of the three phases of bridge legs to work or three groups of two phases of bridge legs in the three phases of bridge legs to work sequentially, wherein the three-phase inverter comprises an A phase bridge leg, a B phase bridge leg, and a C phase bridge leg, the first group of two phases of bridge legs comprises the phase A bridge leg and the B phase bridge leg, the second group of two phases of bridge legs comprises the A phase bridge leg and the C phase bridge leg, and a first group of three phases of bridge legs comprises the B phase bridge leg and the C phase bridge leg.

15. The temperature control device according to claim 14, wherein PWM control signals sent by the control module to the two phases of bridge legs respectively differ from each other in phase by 180 degrees.

16. The temperature control device according to claim 13, wherein when obtaining that the power to be heated of the power battery is not smaller than a second preset power, the control module determines that the number of turn-on bridge legs of the three-phase inverter is 3, and controls the three phases of bridge legs to work simultaneously.

17. The temperature control device according to claim 16, wherein the control module sends PWM control signals with the same phase to the three phases of bridge legs; or the control module sends PWM control signals with different phases to the three phases of bridge legs, the PWM control signal of one phase of bridge leg differing from the PWM control signals of the other two phases of bridge legs in phase by 60 degrees and −60 degrees respectively.

18. The temperature control device according to claim 16, wherein the control module obtains a current value of each phase of bridge leg when the three phases of bridge legs work simultaneously, and makes an average current value of the three phases of bridge legs within a preset current range by adjusting a control signal of each phase of bridge leg; or the control module obtains a current value of each phase of bridge leg when the three the control module obtains a current value of each phase of bridge leg when the three phases of bridge legs work simultaneously, and adjusts the control signal of each phase of bridge leg to make the current values of the three phases of bridge legs not exactly same, and a current difference value of every two phases of bridge legs smaller than a preset current threshold.

19. A vehicle, comprising:

a temperature control device, the temperature control device comprising a motor control circuit and a heat exchange medium circulation loop, wherein:

the motor control circuit comprises a switch module, a three-phase inverter, a three-phase alternating current motor, and a control module, the switch module of the motor control circuit is connected to a power supply module, three phases of coils of the three-phase alternating current motor are connected to three phases of bridge legs of the three-phase inverter, a common contact of the three phases of coils of the three-phase alternating current motor is connected to the switch module, and the control module is connected to the power supply module, the switch module, the three-phase inverter, and the three-phase alternating current motor;

the heat exchange medium circulation loop comprises an electrically driven cooling loop and a cooling loop, the control module is electrically connected to a first valve in the heat exchange medium circulation loop, at least one of the three-phase inverter or the three-phase alternating current motor and the first valve form the electrically driven cooling loop through a heat exchange medium pipeline, and the first valve and a component of the vehicle to be heated form the cooling loop through a heat exchange medium pipeline; and when the component of the vehicle to be heated needs to be heated, the control module controls the switch module to be turned on, controls the first valve to turn on the electrically driven cooling loop and the cooling loop, and enables the power supply module to charge and discharge the three phases of coils alternately by controlling the three-phase inverter, so that the three-phase inverter and the three-phase alternating current motor heat a heat exchange medium flowing through at least one of the three-phase inverter or the three-phase alternating current motor, using heat generated by at least the three-phase inverter or the three-phase alternating current motor.

20. The vehicle according to claim 19, wherein a three-phase alternating current motor comprises a motor shaft, a stator assembly, and a motor housing, the stator assembly is connected to the motor shaft, the stator assembly is provided in the motor housing, the motor housing is provided with a heat exchange medium inlet and a heat exchange medium outlet, a heat exchange medium passage is provided between the motor housing and the stator assembly, and the heat exchange medium passage is connected to the heat exchange medium inlet and the heat exchange medium outlet.

* * * * *